US012651248B2

(12) United States Patent
Cohler et al.

(10) Patent No.: US 12,651,248 B2
(45) Date of Patent: Jun. 9, 2026

(54) WALLET AS A SERVICE

(71) Applicant: Coinbase, Inc., Oakland, CA (US)

(72) Inventors: Yuga Cohler, Cambridge, MA (US); Brock Miller, New York City, NY (US); Alex Stone, San Francisco, CA (US); Jayasudha Jayakumaran, San Diego, CA (US); Paul Hamera, New York City, NY (US)

( * ) Notice: Subject to any disclaimer, the term of this patent is extended or adjusted under 35 U.S.C. 154(b) by 444 days.

(21) Appl. No.: 18/118,644

(22) Filed: Mar. 7, 2023

(65) Prior Publication Data
US 2024/0303637 A1     Sep. 12, 2024

(51) Int. Cl.
G06Q 20/36          (2012.01)

(52) U.S. Cl.
CPC ................................. G06Q 20/3678 (2013.01)

(58) Field of Classification Search
None
See application file for complete search history.

(56) References Cited

U.S. PATENT DOCUMENTS

| | | | |
|---|---|---|---|
| 11,354,657 B2 * | 6/2022 | Fang et al. | |
| 11,842,287 B1 * | 12/2023 | Rosenoer | |
| 2019/0188063 A1 * | 6/2019 | McKellar et al. | |
| 2020/0005292 A1 * | 1/2020 | Mao et al. | |
| 2020/0153606 A1 | 5/2020 | Li et al. | |
| 2022/0318907 A1 | 10/2022 | Bleznak et al. | |

OTHER PUBLICATIONS

Anonymous: "external api—Is there API to create Ether wallet?—Ethereum Stack Exchange", May 14, 2018 (May 14, 2018), pp. 1-4, XP093158563, Internet Retrieved from the Internet: URL:https://ethereum.stackexchange.com/questions/19038/is-there-api-toÂ-create-ether-wallet [retrieved on May 2, 2024].
"International Search Report and Written Opinion of the International Searching Authority," issued in connection with Int'l Appl. No. PCT/US2024/018938, dated May 16, 2024 (14 pages).

* cited by examiner

*Primary Examiner* — Neha Patel
*Assistant Examiner* — Yin Y Choi
(74) *Attorney, Agent, or Firm* — Holland & Hart LLP

(57)          ABSTRACT

Methods, systems, and devices for data management are described. A wallet service may include one or more application programming interface (API) endpoints. An API endpoint may receive a set of requests to broadcast messages via one or more blockchain networks, the set of requests including a first request to broadcast a first message via a first blockchain network and a second request to broadcast a second message via a second blockchain network. A first blockchain message may be generated using a mapping of a plurality of sets of network-specific parameters to respective blockchain networks, and the first blockchain message may include a first set of network-specific parameters. A second blockchain message may also be generated using the mapping, and the second blockchain message may include a second set of network-specific parameters. The first and second blockchain messages may be broadcast via respective nodes of the blockchain networks.

19 Claims, 11 Drawing Sheets

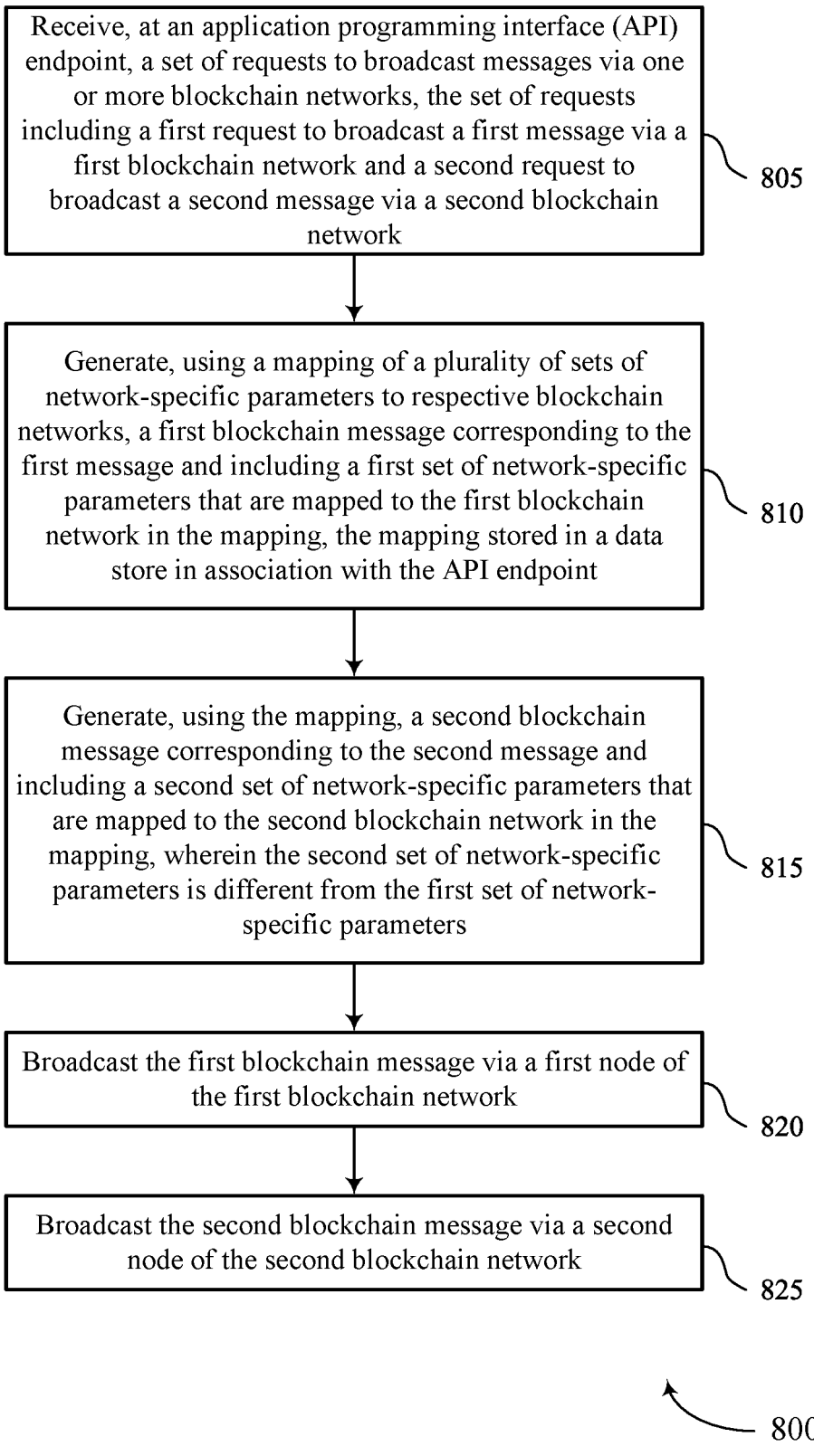

Receive, at an application programming interface (API) endpoint, a set of requests to broadcast messages via one or more blockchain networks, the set of requests including a first request to broadcast a first message via a first blockchain network and a second request to broadcast a second message via a second blockchain network

805

Generate, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint

810

Generate, using the mapping, a second blockchain message corresponding to the second message and including a second set of network-specific parameters that are mapped to the second blockchain network in the mapping, wherein the second set of network-specific parameters is different from the first set of network-specific parameters

815

Broadcast the first blockchain message via a first node of the first blockchain network

820

Broadcast the second blockchain message via a second node of the second blockchain network

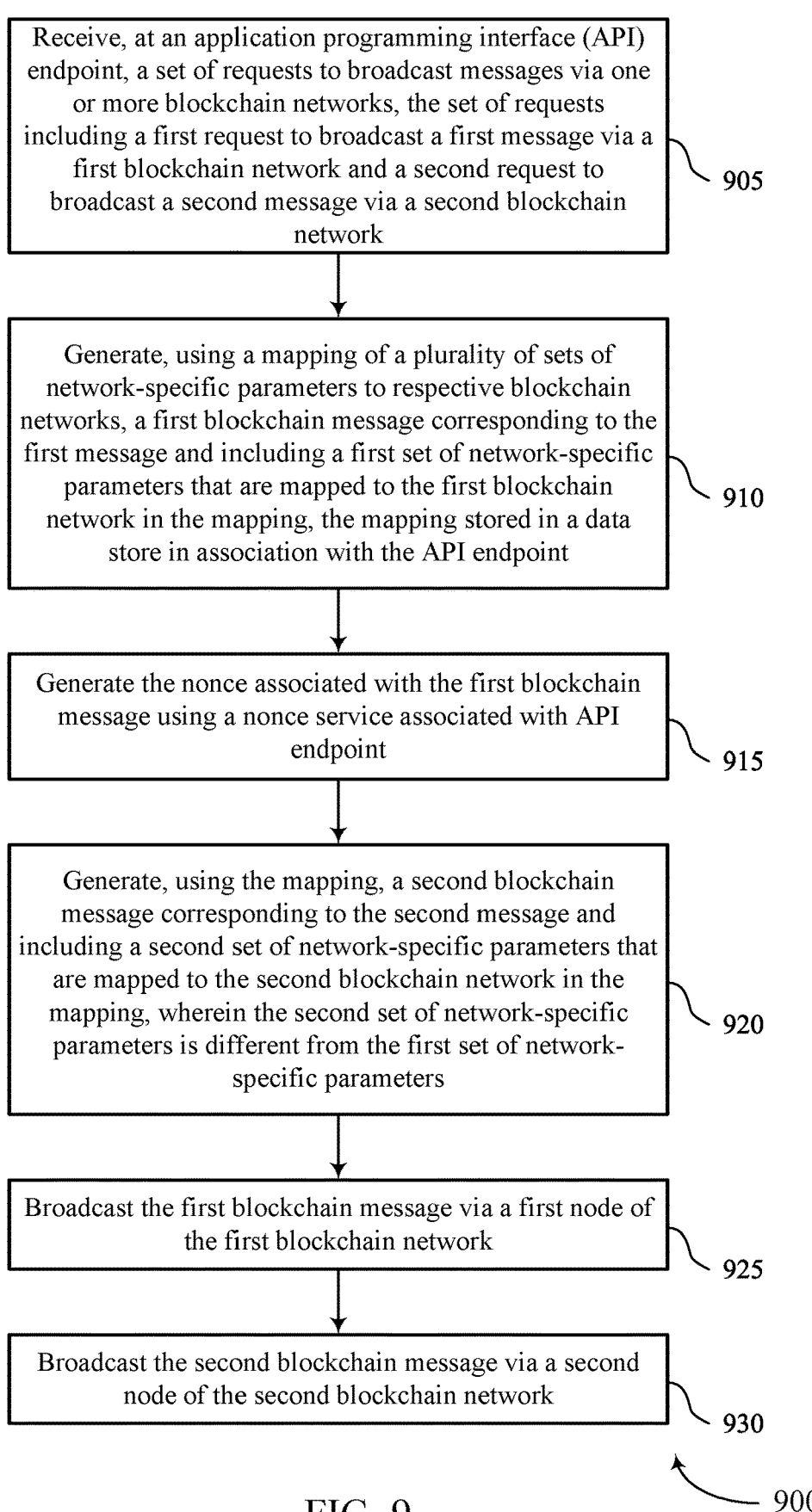

Receive, at an application programming interface (API) endpoint, a set of requests to broadcast messages via one or more blockchain networks, the set of requests including a first request to broadcast a first message via a first blockchain network and a second request to broadcast a second message via a second blockchain network

905

Generate, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint

910

Generate the nonce associated with the first blockchain message using a nonce service associated with API endpoint

915

Generate, using the mapping, a second blockchain message corresponding to the second message and including a second set of network-specific parameters that are mapped to the second blockchain network in the mapping, wherein the second set of network-specific parameters is different from the first set of network-specific parameters

920

Broadcast the first blockchain message via a first node of the first blockchain network

925

Broadcast the second blockchain message via a second node of the second blockchain network

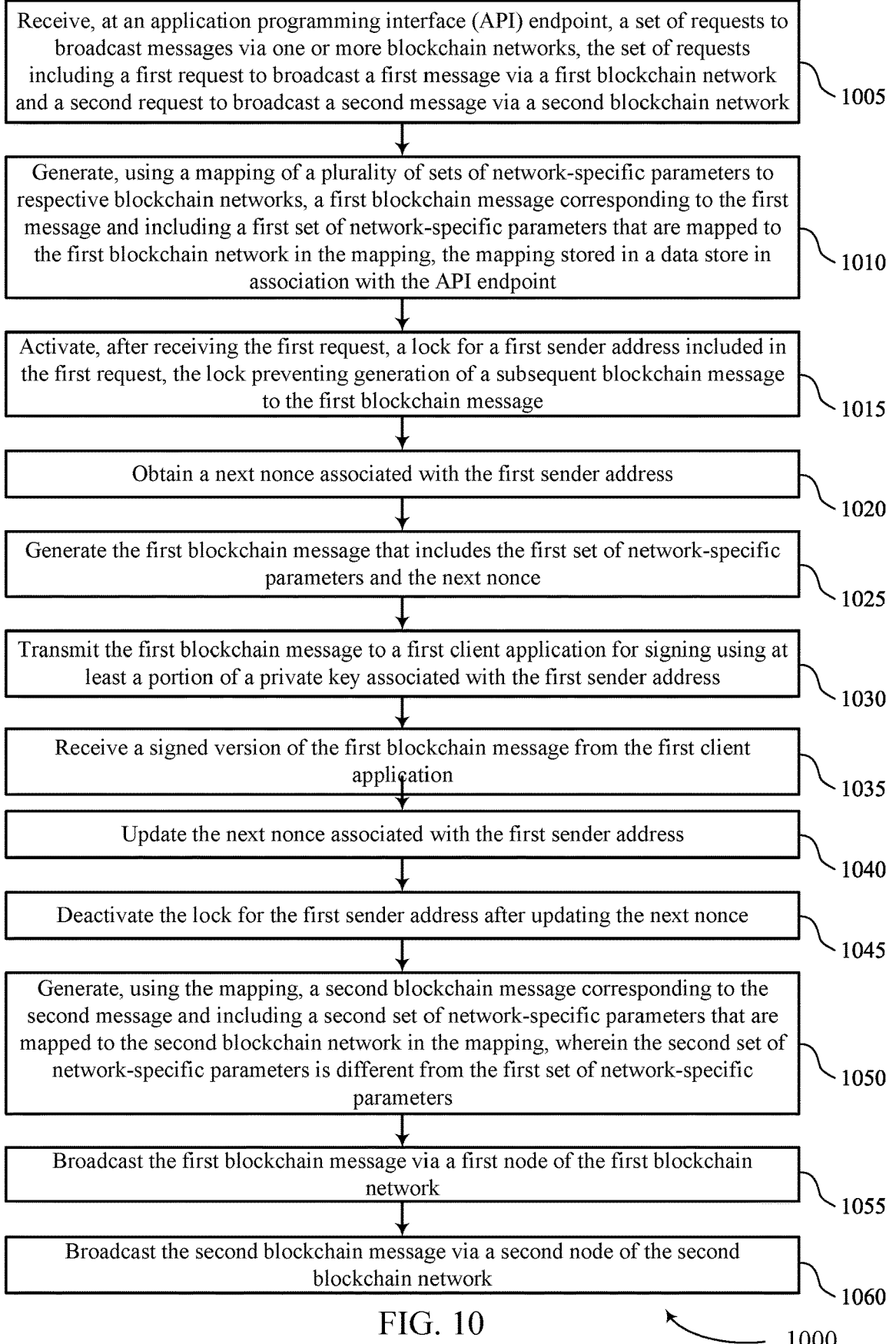

Receive, at an application programming interface (API) endpoint, a set of requests to broadcast messages via one or more blockchain networks, the set of requests including a first request to broadcast a first message via a first blockchain network and a second request to broadcast a second message via a second blockchain network ⟍ 1005

Generate, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint ⟍ 1010

Activate, after receiving the first request, a lock for a first sender address included in the first request, the lock preventing generation of a subsequent blockchain message to the first blockchain message ⟍ 1015

Obtain a next nonce associated with the first sender address ⟍ 1020

Generate the first blockchain message that includes the first set of network-specific parameters and the next nonce ⟍ 1025

Transmit the first blockchain message to a first client application for signing using at least a portion of a private key associated with the first sender address ⟍ 1030

Receive a signed version of the first blockchain message from the first client application ⟍ 1035

Update the next nonce associated with the first sender address ⟍ 1040

Deactivate the lock for the first sender address after updating the next nonce ⟍ 1045

Generate, using the mapping, a second blockchain message corresponding to the second message and including a second set of network-specific parameters that are mapped to the second blockchain network in the mapping, wherein the second set of network-specific parameters is different from the first set of network-specific parameters ⟍ 1050

Broadcast the first blockchain message via a first node of the first blockchain network ⟍ 1055

Broadcast the second blockchain message via a second node of the second blockchain network ⟍ 1060

FIG. 10          ⟍ 1000

WALLET AS A SERVICE

FIELD OF TECHNOLOGY

The present disclosure relates generally to data management, including techniques for configuring and operating a wallet as a service.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIGS. 8 through 11 show flowcharts illustrating methods that support wallet as a service in accordance with aspects of the present disclosure.

DETAILED DESCRIPTION

A wallet application may be used to store digital assets, such as crypto tokens, that are supported by blockchain networks. In some cases, services may be deployed that are enabled or accessed via wallet applications that are configured to transact via blockchain networks. For example, in web3 scenarios, wallet applications are used to store digital assets, enable transactions, serve as digital identity, as well as to support enhanced loyalty programs and token-gated experiences. However, if users or entities (e.g., web3 entities) want to support such experiences, the entities may have to develop a wallet application and system (e.g., a blockchain interface infrastructure, regulatory and data security configurations) for interaction with entity provided services or experiences. Additionally, these entities may have to train users on how to interact with blockchain networks, which can be complex and non-user friendly. Additionally, supporting wallet applications for such service may be costly in terms of computing resources, as an entity may have to maintain a blockchain node to support user interaction via blockchain networks. Moreover, each blockchain network may have different requirements or network-specific parameters for interaction (e.g., broadcasting messages) with the networks, and, as a result, a wallet application for a blockchain network would need to be configured for that particular blockchain network.

Techniques described herein support a service for supporting wallet applications via one or more application programming interface (API) endpoints. The techniques may support entities accessing a wallet service (e.g., via the API endpoints) to create wallets, broadcast transactions, read transactions, etc. Additionally, these services may be supported without user or entity knowledge of the network specific parameters to interact with the blockchain networks. More particularly, after receiving a request (e.g., a message broadcast request or a wallet generation request), the APIs may be configured to add additional parameters and generate a corresponding message such as to perform the requested operation. For example, a user may want to broadcast a transaction to transfer an ether (ETH) token via the Ethereum network. Typically, the client (e.g., wallet application) would perform management of a nonce that is required in the broadcast message. However, nonce management can be complex in some scenarios, and nonce errors may result in declined or stuck transactions. The services described herein support management of nonces on behalf of the client, which may result in improved user experience. Further, since wallet application management may be performed by the service rather than the client and associated entity, the client or associated entity may not be required to configure blockchain resources for network interaction. These and other techniques are described in further detail with respect to the figures.

Figure 1:
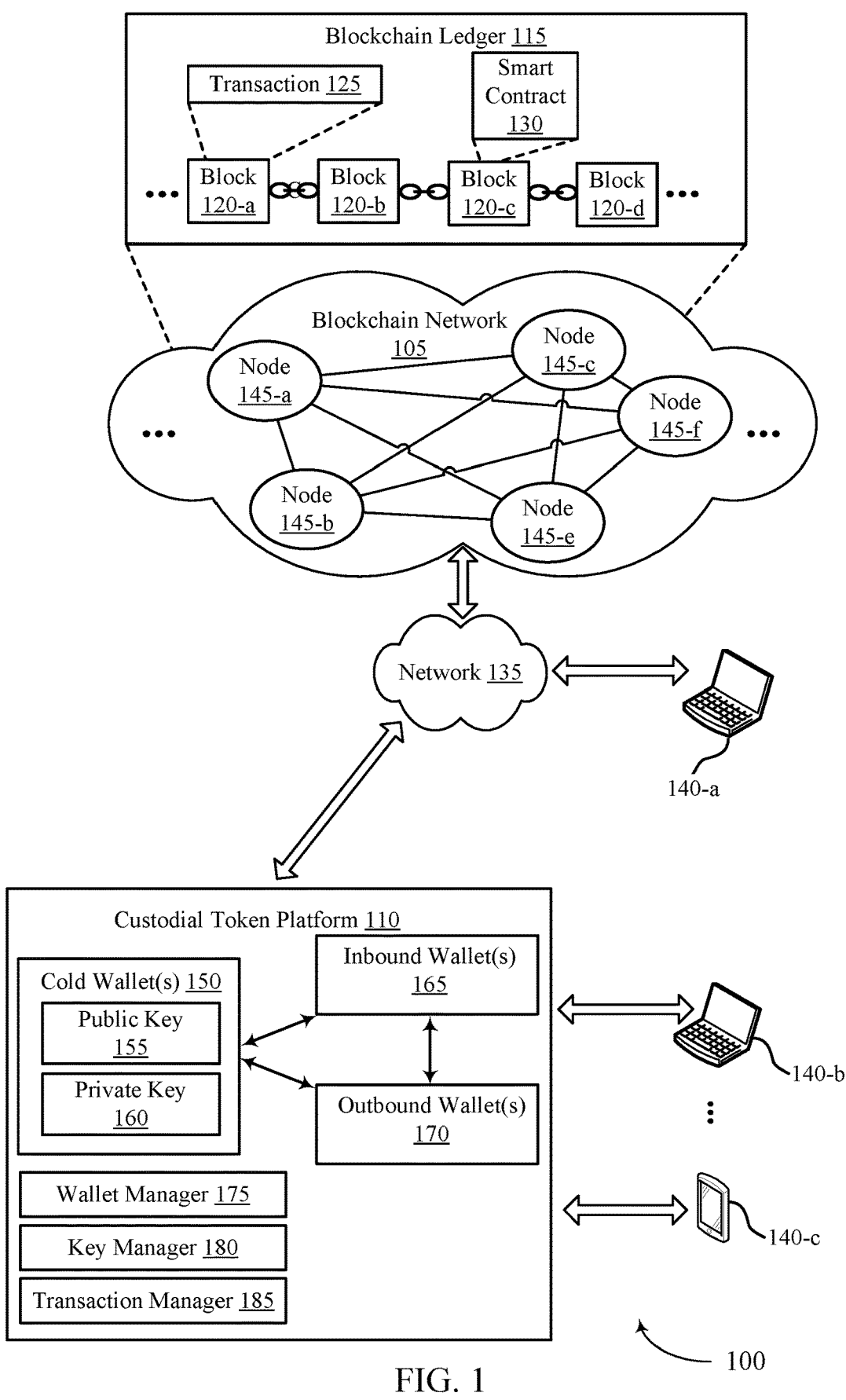
FIG. 1 illustrates an example of a computing environment that supports wallet as a service in accordance with aspects of the present disclosure.

FIG. 1 illustrates an example of a computing environment 100 that supports wallet as a service in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 145-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

As described herein, users may interact with one or more blockchain networks via one or more client applications, wallet applications, or the like. For example, wallet applications may be installed on a computing device or may be added or installed as an add-on (extension) to an application such as a web browser that executes on the computing device (e.g., the computing device 140-a). The wallet application may be associated with one or more wallet addresses and may include functionality for broadcasting messages via one or more blockchain networks, such as blockchain network 105, or for otherwise interacting with the blockchain network (e.g., reading transactions, deploying smart contracts). In some examples, the wallet applications, in association with crypto tokens associated therewith, may be used to access services on the internet. The use of a blockchain wallet to access web services may be referred to as web3.

In web3 or other scenarios, the wallet may be used to store digital assets, to enable transactions, to service as digital identities. Additionally, the wallet may be used for accessing token-gated communities or services and to support loyalty programs. In some examples, entities may want to provide services to users via blockchain wallets. However, wallet onboarding for users and entities may be resource intensive and complex. For example, an entity that wants to provide access to services using a blockchain wallet may be required to build wallet infrastructure from the ground up. That is, the entity may have to manage a blockchain node, build out wallet deployment interfaces and techniques, and client-side operations. The wallet infrastructure may rely on significant processor, memory, and other computing resources, and may require significant maintenance overhead. Additionally, the entity may have to train users on private key security, blockchain operation, regulatory and data security issues, and the like, which may be complex and may turn-away users.

Techniques described herein support services to provide wallets to entities and users via APIs, and the techniques remove blockchain network knowledge from the client and users. That is, the wallet as a service techniques described herein support wallet infrastructure APIs that enable entities to create and deploy fully customizable on-chain wallets for end users. The entities may offer user wallets directly in applications with onboarding as simple as a username and password. As such, end users may explore web3 services without having to manage private keys, recovery phrases, etc. because the wallet as a service techniques described herein may be supported by, for example, multi-party computation (MPC) cryptographic technology. MPC allows the key to split between the end user and the service, which allows the user to access their web3 wallet even if a device is lost, among other advantages.

Thus, the custodial token platform 110 may maintain or may be associated with a set of API endpoints that may be used for wallet instantiation, management, and utilization for entities and users associated with such entities. An entity may access these API endpoint to efficiently build, deploy, and use a wallet application. For example, an organization may build a client that is configured to call the API endpoints to access blockchain networks without having specific knowledge about blockchain technologies or the various networks. Additionally, users may access the client to generate a wallet and interact with the blockchain networks, such as blockchain network 105.

As such, the API endpoints described herein may receive a set of requests to broadcast messages (e.g., transactions) via one or more blockchain networks. The set of requests may include a first request to broadcast a first message via a first blockchain network. For example, the first request may be a request to transfer an NFT on the Ethereum network. The request may include an indication of the sender address (e.g., the address managed by the wallet application sending the NFT), the recipient address, and an identifier of the NFT. However, the request may not include information on which broadcasting via the Ethereum network is conditioned, such as a nonce. The set of requests may also include a second request to broadcast a second message via a second blockchain network. For example, the second request may be a request to transfer a Satoshi via the Bitcoin network. Both the first request and the second request may be received at the same API endpoint and may include similar information, even though these request may result in messages being broadcast on different blockchain networks.

In response to receiving the first request, one or more servers associated with the API endpoint may generate, using a mapping of sets of network-specific (e.g., blockchain network specific) parameters to blockchain networks, a blockchain message corresponding to the first message. The first blockchain message may include network-specific parameters that are mapped to the first blockchain message. Additionally, in response to receiving the second message, the one or more servers may generate, using the mapping, a second blockchain message corresponding to the second message. The second blockchain message may include a second set of parameters that are mapped to the second blockchain network. As described in further detail herein, the use of a mapping by the API endpoint to generate the blockchain messages may facilitate the use of generic (e.g., network-agnostic) request messages, because the network-specific parameters that are conventionally included in the request messages may be generated using the mapping instead of being included in the request messages themselves. The one or more servers may then broadcast the first blockchain message via a first node of the first blockchain network and may broadcast the second blockchain message via a second node of the second blockchain network.

Accordingly, the API requests for broadcasting messages to different network are received at the same API endpoint and the requests may not include blockchain specific information other that the asset (e.g., token) to be transferred. Further, the requests may result in generation of corresponding blockchain messages and broadcasting of such messages via the respective networks. As described in further detail herein, similar techniques may be used for wallet address generation. Accordingly, entities may leverage these APIs to deploy blockchain enabled wallets without having to build out blockchain infrastructure or train users.

Figure 2:
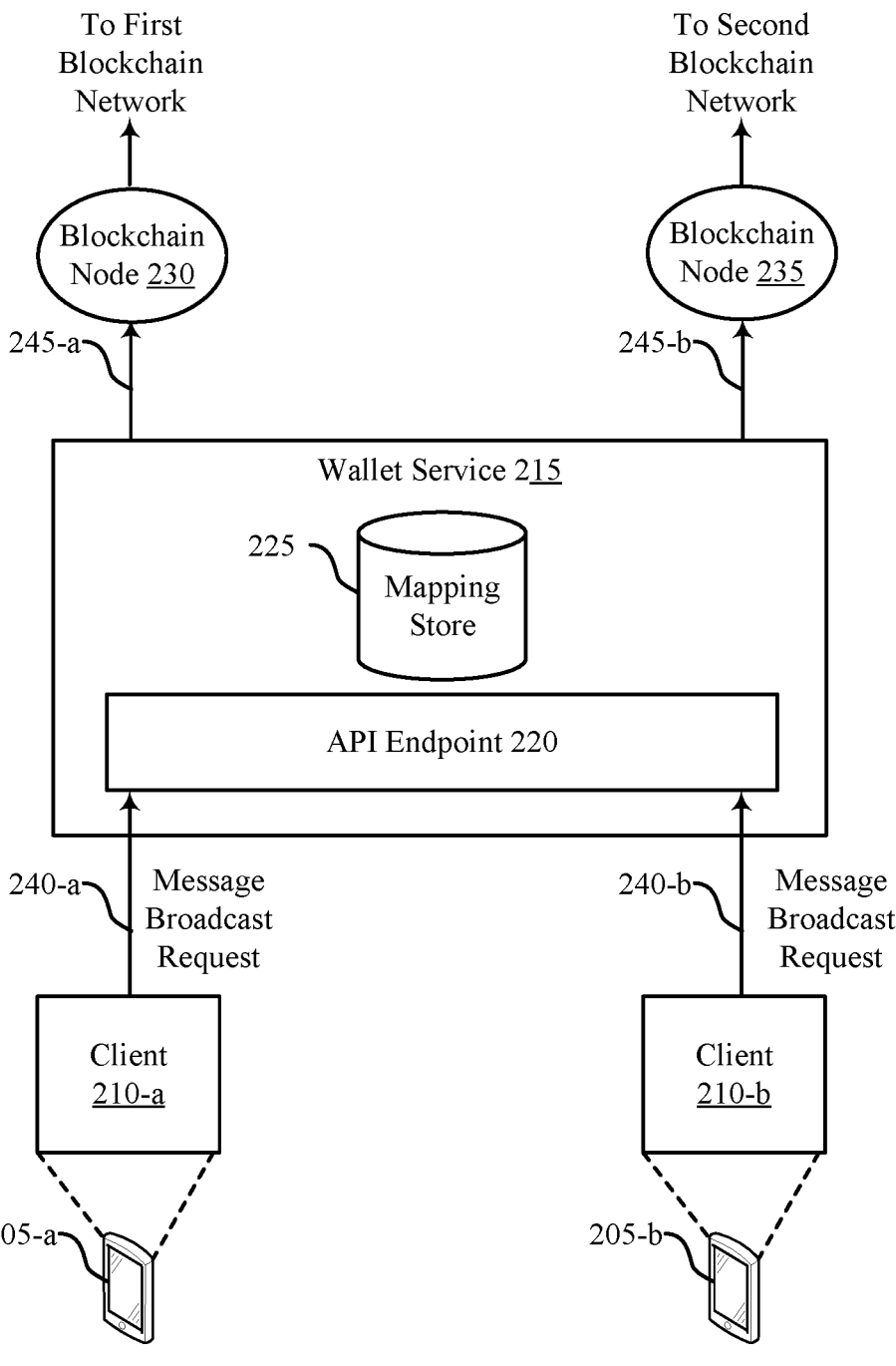
FIG. 2 shows an example of a computing system that supports wallet as a service in accordance with aspects of the present disclosure.

FIG. 2 shows an example of a computing system 200 that supports wallet as a service in accordance with aspects of the present disclosure. The computing system includes computing devices 205, a wallet service 215, a blockchain node 230 and a blockchain node 235. The computing devices 205 may be examples of computing devices 140 of FIG. 1. The wallet service 215 may be associated with or supported by the custodial token platform 110 of FIG. 1. Additionally, or alternatively, the wallet service 215 may be a standalone service separate from the custodial token platform 110 of FIG. 1. The wallet service 215 may be supported by one or more servers.

As described herein, entities or organizations may utilize the wallet service 215 to develop wallet applications that may be used to access blockchain supported services. For example, an organization may deploy a downloadable application (e.g., clients 210) that is configured with wallet functionality and that is used to interact with blockchain networks via the APIs of the wallet service 215, such as API endpoint 220. The use cases of this example are wide ranging and may include a variety of customer scenarios from traditional finance companies wanting to allow customers to buy, sell, and hold crypto tokens to gaming companies wanting to allow users to buy, sell, and use in-game digital assets, such as player skins, upgrades, etc.

The clients 210-a and 210-b may be examples of applications associated with organizations and may be configured for interaction with a blockchain network using the API techniques described herein. The clients 210-a and 210-b may be associated with or developed by different organizations. Alternatively, the clients 210-a and 210-b may be examples of difference instances of the same client. Each of the clients 210-a and 210-b may include blockchain wallet functionality, and as such, may be referred to as wallet applications. For example, the clients 210-a and 210-b may be associated with respective wallet addresses.

As described herein, the functionality of the wallet service 215 allows a user to interact with blockchain networks via the clients 210 without having technical blockchain knowledge and/or without the users having to maintain private key information such as seed phrases. That is, because the wallet service 215 may leverage MPC techniques (or other similar techniques), the clients 210 may be configured to utilize partial private keys that are stored in trusted execution environments (TEEs) (secure enclaves) in the computing devices 205-a. Further, the user may enter username and password (or other credentials) to access the services of the clients 210-a.

The user may access the client 210-a via the computing device 205-a to perform some blockchain functionality, such as sending a token (e.g., a native crypto token, layer 2 token, Dapp token, NFT, etc.) to a recipient address. Using the user interface of the computing device 205-a, the user may enter or otherwise indicate the recipient address and the token (and token amount, if applicable). The user may select or activate a send button (or similar function), which may cause the client to transmit a broadcast request 240-a to the API endpoint 220 of the wallet service 215. The request may include the sender address (e.g., the address of the client 210-a), the recipient address, and the token. However, the broadcast request 240-a may not include additional information on which broadcasting via a blockchain network is conditioned, such as a nonce value, or other network-specific parameters that may have been conventionally included in such broadcast request messages. This information is instead handled by the wallet service 215, and as such, these complexities are abstracted away from the user and the client 210-a.

After receiving the broadcast request 240-a, the wallet service 215 may generate a blockchain message based on the request by adding the requisite parameters, information, etc.

associated with the blockchain network to which the blockchain message is to be broadcast. To support blockchain message generation based on limited information included in the request, the wallet service 215 may maintain a mapping store 225, which stores mappings of network-specific parameters to respective blockchain networks. For example, the mapping store 225 maintains a mapping of Ethereum network required parameters for the broadcasting via the Ethereum network, a mapping of Bitcoin network required parameters for broadcasting via the Bitcoin network, etc. That is, the mapping store 225 may maintain such mappings for tens, hundreds, or more different networks of various types including Ethereum virtual machine (EVM) supported networks and networks with various different types of consensus mechanisms. The networks included in the mapping store 225 may include layer1 and layer2 networks.

After generating the blockchain message based on the broadcast request 240-*a*, the wallet service 215 may surface the blockchain message to the client 210-*a* for adding a digital signature. For example, the message may be transmitted to the client 210-*a* so that the client may sign the message using a private key shard. The message may then be returned to the wallet service 215 for adding the full signature (if applicable) and then broadcasting via a respective blockchain node. For example, the wallet service 215 may broadcast signed message 245-*a* to the first blockchain network via blockchain node 230.

The client 210-*b* may perform a similar operation to broadcast a second message. For example, the client 210-*b* sends a broadcast request 240-*b* to the API endpoint 220. The broadcast request 240-*b* may be a request to broadcast a message using a different blockchain network than the first blockchain network. However, as described herein, the message requests for broadcasting via different blockchain networks may be received at the same API endpoint 220 (e.g., rather than being received at different network-specific API endpoints). The wallet service 215 uses the mapping store to identify requisite parameters and generate the corresponding blockchain message. The generated message, which may be signed by the client 210-*b* is broadcast by the wallet service 215. For example, the signed blockchain message 245-*b* is broadcast to a second blockchain network via the blockchain node 235.

Figure 3:
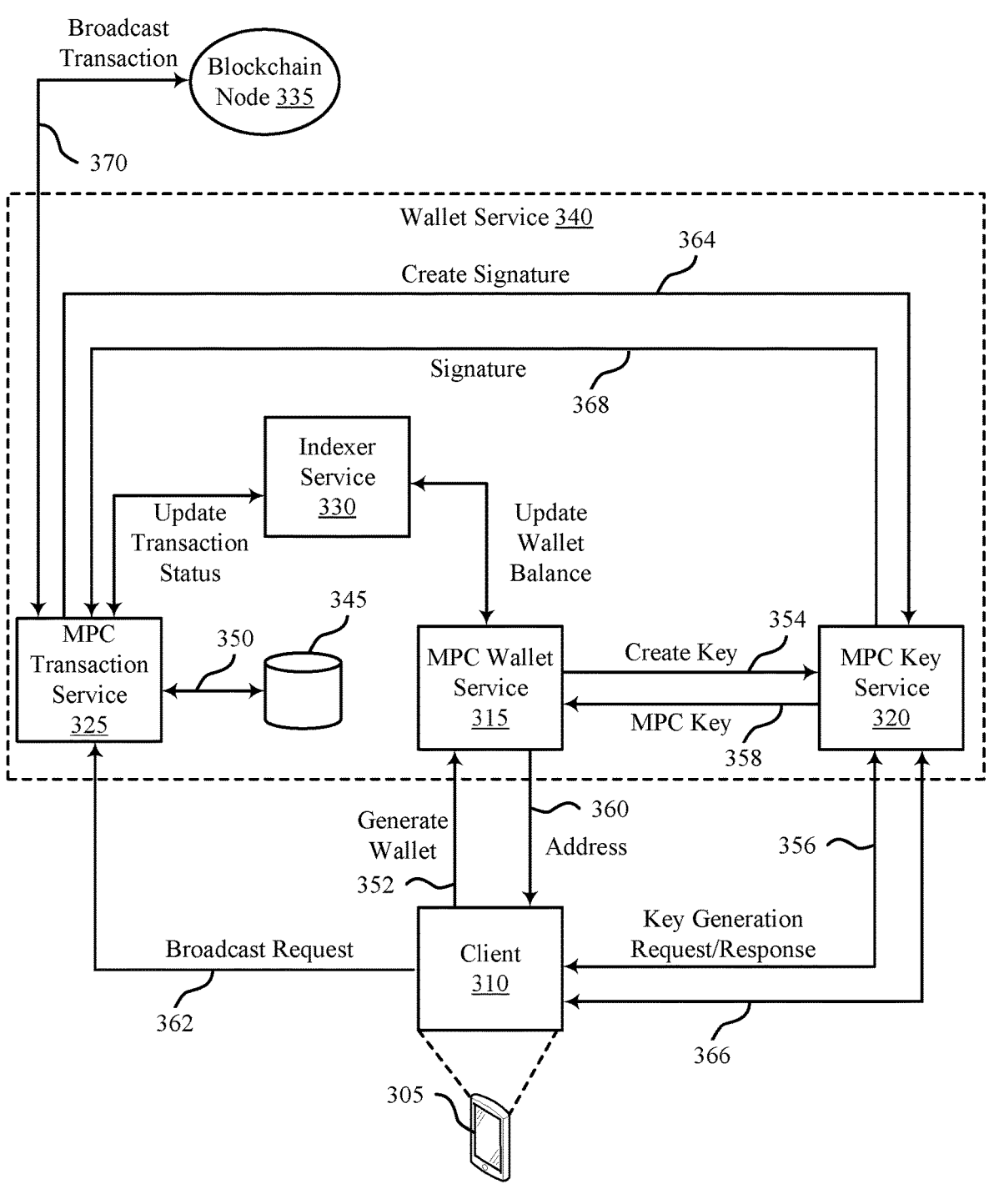
FIG. 3 shows an example of a signal flow diagram that supports wallet as a service in accordance with aspects of the present disclosure.

FIG. 3 shows an example of a signal flow diagram 300 that supports wallet as a service in accordance with aspects of the present disclosure. The signal flow diagram 300 includes a computing device 305, a wallet service 340, and a blockchain node 335. The computing device, which may be an example of the computing devices 140 of FIG. 1 or the computing devices 205 of FIG. 2, may execute a client 310. The client 310 may be an example of the client 210 and may be configured to interact with blockchain networks using the wallet service 340, as described herein.

The signal flow diagram 300 illustrates example operations, using the wallet service 340, for generating a wallet for the client 310, broadcasting a message, and additional operations of the wallet service 340. The wallet service 340 may include various services or components, such as MPC wallet service 315, MPC key service 320, MPC transaction service 325, indexer service 330, among other services or components. The services and components of the wallet services 340 may be supported by one or more servers. The services of the wallet services 340 may correspond to one or more API endpoints. In some examples, the API endpoints are used internally (e.g., called by other services in the wallet service 340) or externally by clients, such as the client 310. The various services of the wallet service 340 support the techniques as described herein.

As described herein, the client 310 may be an example of the application, and the user may activate a UI component of the client 310 to generate a wallet for utilization with blockchain networks. In response to activating the UI component, the client 310 may transmit a request 352 to an API endpoint of the MPC wallet service 315 that is used for wallet generation. The request may not include an indication of a private key, as may be typical for other address generation techniques. Rather, the wallet service 340 may handle or activate private key generation using MPC techniques. Additionally, the request 352 may not include an indication of one or more properties associated with the blockchain network for which the address is to be generated. For example, the request 352 may not indicate an elliptic curve function to be used for generation of the address. Rather, as described with respect to FIG. 2, the wallet service 340 may maintain a set of mappings of blockchain networks to parameters that are used for address generation (and message broadcasting).

The MPC wallet service 315 may transmit a request 354 to the MPC key service 320 to generate the key. The request 354 may include additional parameters added by the MPC wallet service 315 and identified from the mapping. The MPC key service 320 may perform operations at 356 with the client 310 to generate a private key. For example, the MPC key service 320 may cause the client 310 to generate a private key (e.g., using the secure enclave) and transmit a portion (shard) of the private key to the MPC key service 320. The MPC key service 320 may additionally or alternatively communicate the MPC key, at 358, which is returned to the client 310 by the MPC wallet service 315 as response 360. Thus, the client 310 may be configured with a wallet address.

After the client 310 is configured with the wallet address, the client 310 may interact with a blockchain network. The wallet address may be associated with a token via the blockchain network, and the user may want to send the token to a recipient address. The user may access the UI of the client 310 and enter parameters such as token type, amount, and recipient address into the UI. After complete, the user may activate a send or transact button, which may cause the client to transmit, to the API endpoint associated with the MPC transaction service 325, a request 362 to broadcast a message via a blockchain network. As described herein, the request 362 may include information such as sender address (e.g., the wallet address of the client 310), token type, amount, and recipient address. However, the request 362 may not include network-specific information that is required to broadcast on the blockchain network. Rather, as described herein, such information may be handled or added by the wallet service 340. For example, in the case of transactions on the bitcoin network, the request 362 may not include unspent transaction output (UTXO) information. In another example, if the request is for broadcasting via the Ethereum network, the request 362 may not include a nonce value. Rather, the UTXO information or the nonce value is generated by the wallet service 340.

After receiving the request 362 at the API endpoint of the MPC transaction service 325, the MPC transaction service 325 may access mapping store 345 to generate the message for broadcasting via the respective blockchain network. The mapping store 345 may be an example of the mapping store 225 of FIG. 2 and may contain mappings of multiple sets of network-specific parameters to respective blockchain networks. Thus, the MPC transaction service 325 may retrieve parameters 350 from the mapping store 345 and generate a blockchain message that includes the network-specific parameters for the blockchain network.

The MPC transaction service 325 may communicate with the MPC key service 320 by transmitting a create signature request 364. The create signature request 364 may include the generated blockchain message, a portion thereof, or other information that is used for signature generation. The MPC key service 320 may create the signature and communicate with the client 310 to obtain a signed message. For example, the MPC key service 320 and the client 310 may perform MPC operations at 366 to generate a full signature. In some examples, the MPC key service 320 causes the client 310 to display the generated transaction and prompts the user for a signature. The user may activate a UI component to cause the computing device to sign the message using a shard of the private key. The partially signed message may be returned to the MPC key service 320, which may perform operations to sign the partially signed message using a second key shard, resulting in a fully signed message. The fully signed message may be returned to the MPC transaction service 325. The MPC transaction service 325 may communicate, at 370, with a blockchain node 335 to broadcast the signed message via the blockchain network. In some examples, the mapping store 345 may maintain mappings of blockchain networks and node identifiers (e.g., endpoints) that are used to broadcast respective blockchain messages. As such, the MPC transaction service 325 is able to broadcast blockchain messages to the corresponding blockchain node.

The indexer service 330 of the wallet service 340 may be used to monitor on-chain data to determine whether transactions are confirmed, to determine whether wallets have enough balance to support transactions, etc. In some examples, the indexer service 330 communicates with the MPC transaction service 325 and/or the MPC wallet service 315 to provide information such as transaction/message confirmation. For example, after the message is broadcast at 370, the indexer service 330 may determine if and when the broadcast message is confirmed on the blockchain network and provide such information to the MPC transaction service 325. The MPC transaction service 325 may then communicate transaction confirmation information to the client 310 for display to the user.

Further, broadcasting messages via some blockchain networks, such as EVM based networks, may be conditioned on the message including a nonce value. In some examples, services rely on the client to perform nonce management. However, techniques described herein support nonce management by the wallet service 340, which removes complexities from the client and reduces transaction errors on blockchain networks. Accordingly, the MPC transaction service 325 may perform nonce management for the generated transaction. Nonce management may include the wallet service 340 using techniques to maintain documentation of pending transactions for an address, such as an address associated with the client 310. Using the techniques described herein, a global worker may be used to document transactions for an address.

When the client 310 transmits the API broadcast request 362 to the MPC transaction service 325, the initial state of the transaction is as follows:

Next Nonce to Sign: N

Transaction State: Signing

After receiving the request 362, a fulfill transaction workflow may be activated. The job of this temporal workflow is to store the signed transaction in a database. The MPC transaction service 325 may document a nonce of the last signed transaction (associated with the same sender address of the client 310) and assigns the nonce of the last signed transaction to a transaction input parameter for broadcasting the transaction. Nonce assignment may be guarded by an address-based lock. The following operations may be used for nonce management:

1. Obtain the address lock
2. Get the next nonce
3. Prepare or generate the transaction for signing
4. Create the signature
5. Wait for the create signature operation to complete (e.g., for the client to participate in the MPC operations)
6. Store the signed transaction
7. Update the nonce
8. Release the address lock.

It is assumed that at most one transaction can be in the "signing" state per sender address. Thus, when the MPC transaction service 325 receives the request 362, the MPC transaction service may obtain the address lock, retrieve the next nonce, and generate the transaction (using the mapping store 345, as described herein). Thus, operation 4 (corresponding to creation of the signature) above corresponds to the create signature request 364 and the MPC transaction service 325 waits for an indication that the create signature operation to complete at 368. The MPC key service 320 interacts with the client 310 to retrieve or generate the complete signature. After the MPC transaction service 325 receives the indication that the signature is complete, the MPC transaction service 325 may store the signed version of the blockchain message and update the nonce. The address lock may be released since the message is no longer in the signing state. In some cases, since the wallet service 340 may not have direct control over when the client 310 participates in the MPC for generating the signature, the lock may be held as long as the create signature operation is valid (e.g., up to 24 hours). After receiving the signed message, the state of the message/transaction is as follows:

Next Nonce to Sign: N

Transaction State: Signed

The wallet service 340 may implement techniques to avoid scenarios involving ghost transactions, which may occur when multiple transactions from the same address end up in a mem pool (e.g., an unconfirmed message pool) associated with the blockchain network, and a transaction with nonce N fails (e.g., due to insufficient funds), thereby blocking transactions with nonce N+1 and higher. According to the techniques implemented by the wallet service 340, a transaction with nonce N is not broadcast until the transaction with nonce N−1 is final (e.g., confirmed or failed) on-chain as indicated by the service's data store. The wallet service 340 may configure a worker/job to execute at a regular interval that queries a database for transactions in the signed state with the smallest nonce N for a given address. The state of the transaction with the same address is checked on-chain and one or more of the following cases is identified for the transaction/message:

1. The transaction with nonce N−1 has confirmed/failed on-chain (e.g., the transaction is in a final state on-chain). In this case, the nonce N−1 has been consumed on the network, so the worker broadcasts transaction with nonce N.
2. The transaction with nonce N−1 has not confirmed or failed on-chain.

a. The transaction is in the mem-pool waiting to be confirmed. In this case, the worker may not perform an operation for this transaction.

b. The transaction is not in the mem-pool waiting to be confirmed. This may occur if the transaction is rejected by the node due to an insufficient balance.

To address case 2(b), after the worker broadcasts each transaction, if the node's response is that the address has an insufficient balance, an error message may be recorded in a broadcast data store (e.g., where the signed messages are stored). The broadcast remains in a signed state. One or more workers per blockchain network may be configured to perform these nonce management operations. The following table 1 illustrates errors and remedies in case broadcasting a transaction fails:

TABLE 1

| Scenario | Description | Remedy |
|---|---|---|
| The node is down or unavailable. | The node is down or unavailable. | Do nothing. The next workflow will pick the transaction up and retry. |
| Insufficient funds. | The total cost of executing a transaction is higher than the balance associated with the sender address. | Do nothing. The transaction will be successfully broadcast once the user replenishes their account, so a subsequent workflow will pick it up and retry. |
| Nonce too high. | The nonce of a transaction is higher than the next one expected based on the mempool. | This may happen if a broadcast was actually successful, but the service was unable to record the successful transaction and determined that the transaction did not reach the confirming state |
| Nonce too low. | The nonce of a transaction is lower than the next one expected based on the mempool. | This happens if the user has submitted an out-of-bound transaction (e.g., not through the wallet service 340). |

The wallet service 340 may rely on a transaction state subscriber to handle updating the broadcasted transaction state. The following operations may be used if a transaction with nonce N is confirmed and there is a block reorganization on the network:

1. Transaction N is pushed back into the mempool
2. The MPC transaction service 325 determines that Transaction N is confirmed and broadcasts the transaction N+1
3. The blockchain is reorganized, transaction N is now back in the confirming state.
4. Transaction N+1 is now blocked because Transaction N is no longer in the confirmed state.
5. Transaction N gets confirmed in a new block, unblocking transaction N+1.
6. If the transaction N+1 cannot fail it will confirm and normal process will continue
7. If transaction N+1 fails then the subsequent enqueued transactions are marked as failed. The already submitted transaction may get flushed out of the mempool because it is invalid.

In some cases, the client 310 may be able to broadcast transactions on the blockchain without the use of the MPC transaction service 325. In these cases, the MPC transaction service 325 may not be aware of these out-of-band transactions, which means the internal nonce management state may get out of sync with the blockchain. To mitigate this risk, the MPC transaction service 325 may update broadcast state even if the transaction is not found in the service's own data store. In this case, the MPC transaction service 325 may create a new transaction record, cancel any transactions with the same nonce value, and update the next nonce to sign value. Additionally, the wallet service 340 may provide an option for clients to specify "override_nonce." When this bit is set, the service may respect the value of the nonce specified in a transaction input (e.g., EVMTransaction-Input), which may result in the MPC transaction service 325 skipping the operation of locking on the nonce and updating the next pending nonce to sign. This functionality may be provided to implement transaction replacement and cancellation. Further, this option may allow the client to self-correct internal state of the service in rare cases the service is out of sync with the blockchain network.

Accordingly, the wallet service 340 may provide support for wallet generation and transaction via multiple different blockchains using various API endpoints and internal services. These services and techniques may result in improved user experience as well as reduced processor and compute resource overhead by entities leveraging the wallet service 340.

Figure 4:
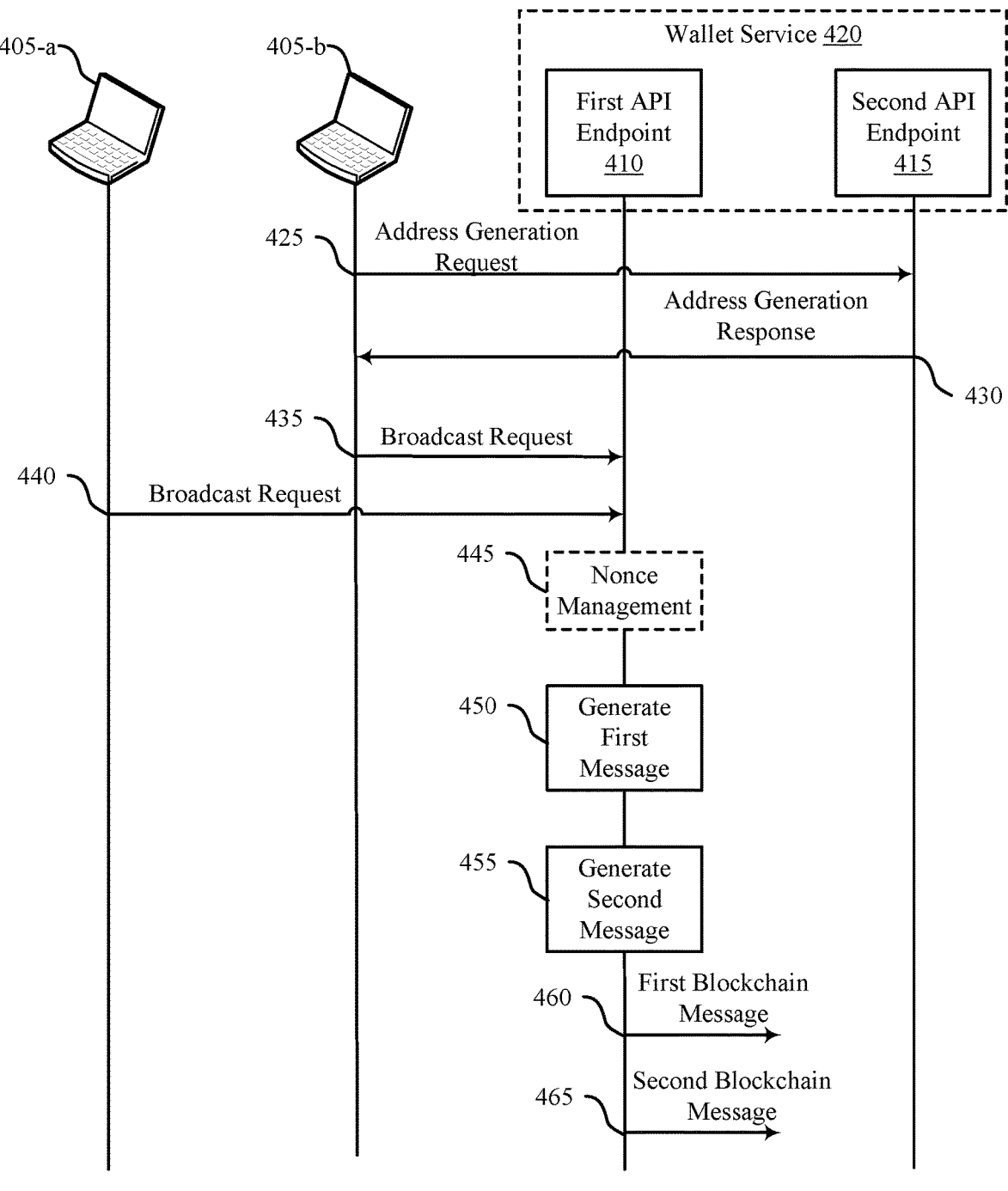
FIG. 4 shows an example of a process flow that supports wallet as a service in accordance with aspects of the present disclosure.

FIG. 4 shows an example of a process flow 400 that supports wallet as a service in accordance with aspects of the present disclosure. The process flow 400 includes computing devices 405 and a wallet service 420, which may be examples of the corresponding devices and systems as described with respect to FIGS. 1 through 3. The computing device 405-a and 405-b may include application clients that are configured to interact with the wallet service 420 to support the techniques described herein. The wallet service 420 includes a first API endpoint 410, which may be used for receiving transaction broadcast requests and performing operations to broadcast corresponding messages via respective blockchain networks. The wallet service 420 also includes a second API endpoint 415, which may be used for wallet generation. In the following description of the process flow 400, the operations between the aspects of the process flow may be transmitted in a different order than the example order shown, or the operations performed may be performed in different orders or at different times. Some operations may also be omitted from the process flow 400, and other operations may be added to the process flow 400.

At 425, the wallet service 420 may receive, at the second API endpoint 415 and from the computing device 405-*b*, a request to generate a first sender address. The request to generate the first sender address may exclude an indication of a private key or an indication of one or more properties on which generation of addresses for use with the first blockchain network is conditioned. Rather, such information and private key generation may be handled by the wallet service 420, as described herein. For example, the wallet service 420 may reference a mapping to identify which parameters (e.g., elliptic curve function) to use for address generation. In some examples, the wallet service 420 may use MPC techniques to cause the computing device 405-*b* to generate the private key, or a portion thereof, on the computing device 405-*b*. At 430, the second API endpoint 415 of the wallet service 420 may transmit, in response to the request, an address generation response. The request generation response may include an indication of the sender address or an indication that the wallet generation process is complete.

At 435, the wallet service 420 may receive, at the first API endpoint 410, a first request to broadcast a first message via a first blockchain network. At 440, the wallet service 420 may receive, at the first API endpoint 410, a second request to broadcast a second message via a second blockchain network. In some examples, the first request includes a first token type and a first sender address and excludes additional information on which broadcasting via the first blockchain network is conditioned. In some examples, the second request includes a second token type and a second sender address and excludes additional information on which broadcasting via the second blockchain network is conditioned. Further, the first blockchain network and the second blockchain network are associated with respective sets of properties, and the first request and the second request exclude indications of properties of the respective sets of properties. In some cases, the first request and the second request include corresponding quantities of parameters.

At 445, the first API endpoint 410 may perform nonce management for the first request. That is, if the first blockchain network requires a nonce for a message broadcast on the first blockchain network, then the wallet service 420 may perform nonce management. In such cases, the first request may not include an indication of a nonce for the first blockchain network. Nonce management may include the wallet service 420 generating a nonce associated with the first blockchain message using a nonce service associated with the first API endpoint 410. To generate the nonce, the wallet service 420 may activate, after receiving the first request, a lock for a first sender address included in the first request. The lock may prevent generation of a subsequent blockchain message to the first blockchain message for the sender address associated with the first blockchain message. The wallet service 420 may then obtain a next nonce associated with the first sender address, transmit the first blockchain message to a first client application for signing using at least a portion of a private key associated with the first sender address, and receive a signed version of the first blockchain message from the first client application. In some cases, the wallet service 420 may store the signed version of the first blockchain message for broadcasting until a blockchain message associated with the first sender address and having a previous nonce to the next nonce is associated with a final state (e.g., confirmed on-chain or failed on-chain) on the first blockchain network.

At 450, the wallet service 420 may generate, using a mapping of a plurality of sets of network-specific parameters to respective blockchain networks, a first blockchain message corresponding to the first message and including a first set of network-specific parameters that are mapped to the first blockchain network in the mapping. The mapping may be stored in a data store in association with the API endpoint.

At 455, the wallet service 420 may generate, using the mapping, a second blockchain message corresponding to the second message and including a second set of network-specific parameters that are mapped to the second blockchain network in the mapping. The second set of network-specific parameters is different from the first set of network-specific parameters.

At 460, the wallet service 420 may broadcast the first blockchain message via a first node of the first blockchain network. At 465, the wallet service 420 may broadcast the second blockchain message via a second node of the second blockchain network.

Figure 5:
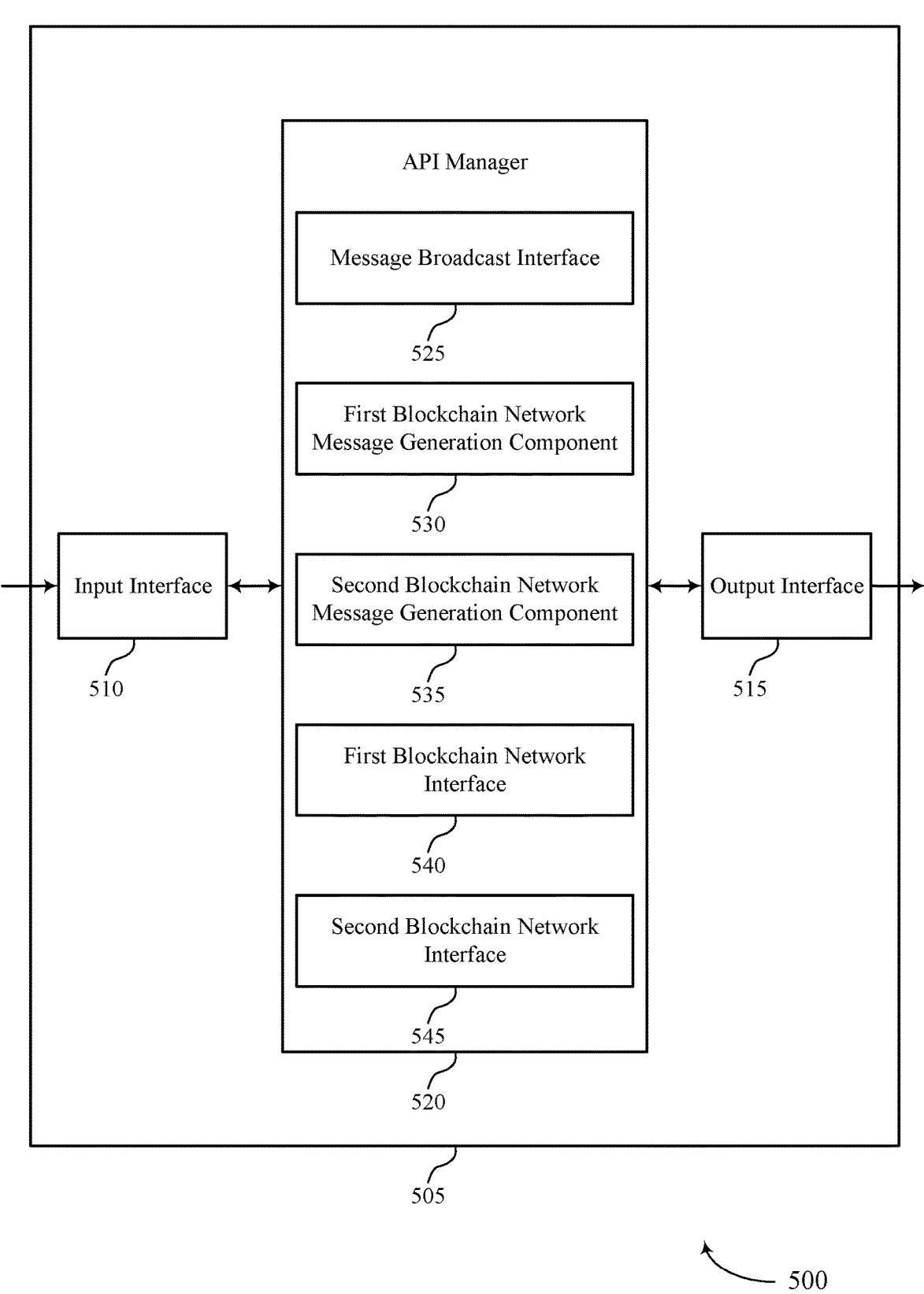
FIG. 5 shows a block diagram of an apparatus that supports wallet as a service in accordance with aspects of the present disclosure.

FIG. 5 shows a block diagram 500 of a system 505 that supports wallet as a service in accordance with aspects of the present disclosure. The system 505 may include an input interface 510, an output interface 515, and an API manager 520. The system 505 may also include a processor. Each of these components may communicate, directly or indirectly, with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the API manager 520 to support wallet as a service. In some cases, the input interface 510 may be a component of a network interface 725 as described with reference to FIG. 7.

The output interface 515 may manage output signaling for the system 505. For example, the output interface 515 may receive signaling from other components of the system 505, such as the API manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the API manager 520 may include a message broadcast interface 525, a first blockchain network message generation component 530, a second blockchain network message generation component 535, a first blockchain network interface 540, a second blockchain network interface 545, or any combination thereof. In some examples, the API manager 520, or various components thereof, may be configured to perform various operations (e.g., receiving, monitoring, transmitting) using or otherwise in cooperation with the input interface 510, the output interface 515, or both. For example, the API manager 520 may receive information from the input interface 510, send information to the output interface 515, or be integrated in combination with the input interface 510, the output interface 515, or both to receive information, transmit information, or perform various other operations as described herein.

The message broadcast interface 525 may be configured as or otherwise support a means for receiving, at an application programming interface (API) endpoint, a set of requests to broadcast messages via one or more blockchain networks, the set of requests including a first request to broadcast a first message via a first blockchain network and a second request to broadcast a second message via a second blockchain network. The first blockchain network message generation component 530 may be configured as or otherwise support a means for generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The second blockchain network message generation component 535 may be configured as or otherwise support a means for generating, using the mapping, a second blockchain message corresponding to the second message and including a second set of network-specific parameters that are mapped to the second blockchain network in the mapping, wherein the second set of network-specific parameters is different from the first set of network-specific parameters. The first blockchain network interface 540 may be configured as or otherwise support a means for broadcasting the first blockchain message via a first node of the first blockchain network. The second blockchain network interface 545 may be configured as or otherwise support a means for broadcasting the second blockchain message via a second node of the second blockchain network.

Figure 6:
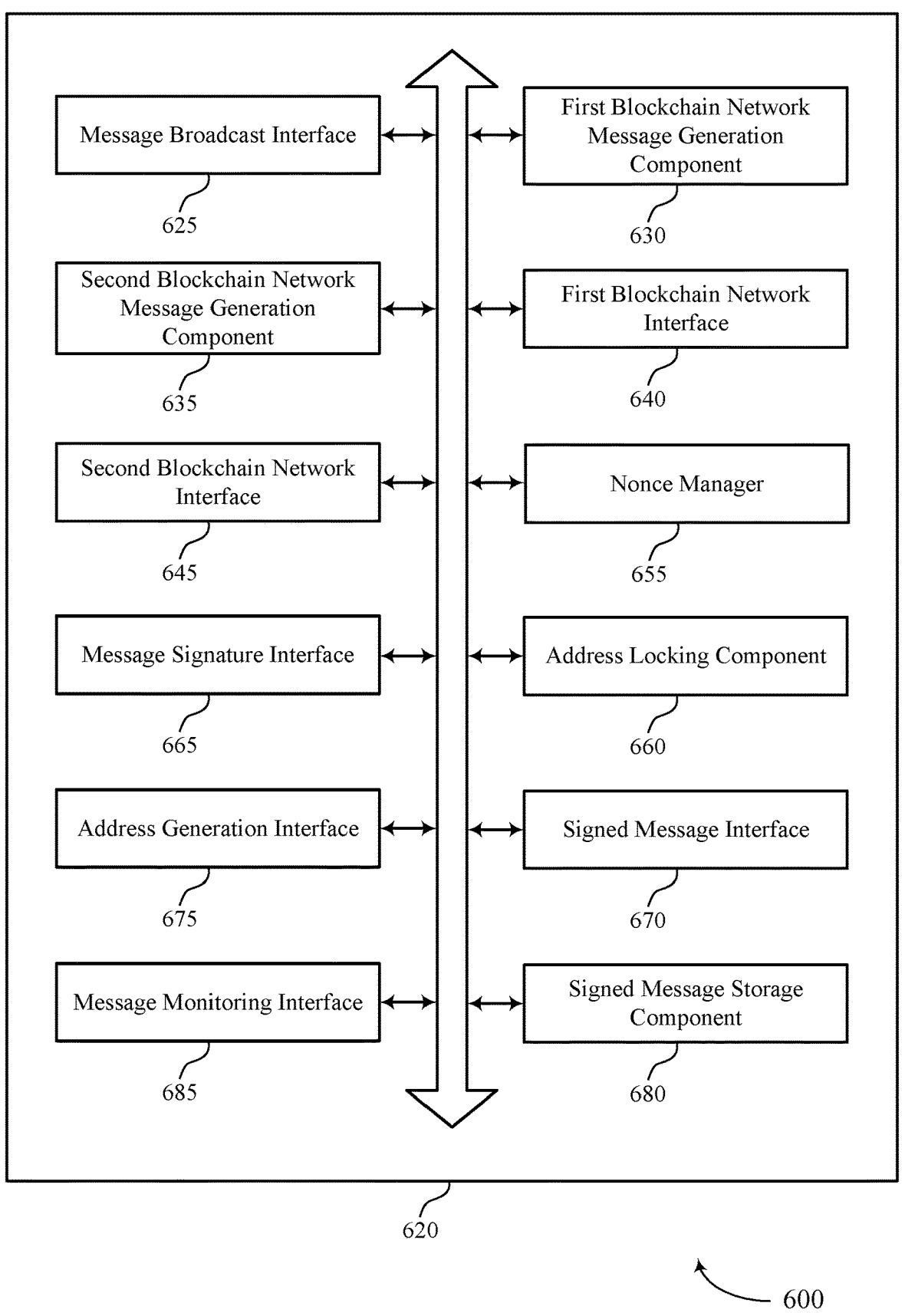
FIG. 6 shows a block diagram of an application programming interface (API) manager that supports wallet as a service in accordance with aspects of the present disclosure.

FIG. 6 shows a block diagram 600 of an API manager 620 that supports wallet as a service in accordance with aspects of the present disclosure. The API manager 620 may be an example of aspects of an API manager or an API manager 520, or both, as described herein. The API manager 620, or various components thereof, may be an example of means for performing various aspects of wallet as a service as described herein. For example, the API manager 620 may include a message broadcast interface 625, a first blockchain network message generation component 630, a second blockchain network message generation component 635, a first blockchain network interface 640, a second blockchain network interface 645, a nonce manager 655, an address locking component 660, a message signature interface 665, a signed message interface 670, an address generation interface 675, a signed message storage component 680, a message monitoring interface 685, or any combination thereof. Each of these components may communicate, directly or indirectly, with one another (e.g., via one or more buses, communications links, communications interfaces, or any combination thereof).

The message broadcast interface 625 may be configured as or otherwise support a means for receiving, at an application programming interface (API) endpoint, a set of requests to broadcast messages via one or more blockchain networks, the set of requests including a first request to broadcast a first message via a first blockchain network and a second request to broadcast a second message via a second blockchain network. The first blockchain network message generation component 630 may be configured as or otherwise support a means for generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The second blockchain network message generation component 635 may be configured as or otherwise support a means for generating, using the mapping, a second blockchain message corresponding to the second message and including a second set of network-specific parameters that are mapped to the second blockchain network in the mapping, wherein the second set of network-specific parameters is different from the first set of network-specific parameters. The first blockchain network interface 640 may be configured as or otherwise support a means for broadcasting the first blockchain message via a first node of the first blockchain network. The second blockchain network interface 645 may be configured as or otherwise support a means for broadcasting the second blockchain message via a second node of the second blockchain network.

In some examples, the first request includes a first token type, a first sender address, and excludes additional information on which broadcasting via the first blockchain network is conditioned. In some examples, the second request includes a second token type, a second sender address, and excludes additional information on which broadcasting via the second blockchain network is conditioned.

In some examples, the first blockchain network and the second blockchain network are associated with respective sets of properties. In some examples, the first request and the second request exclude indications of properties of the respective sets of properties.

In some examples, the first request and the second request include a corresponding quantity of parameters.

In some examples, to support generating the first blockchain message, the nonce manager 655 may be configured as or otherwise support a means for generating the nonce associated with the first blockchain message using a nonce service associated with API endpoint.

In some examples, to support generating the first blockchain message, the address locking component 660 may be configured as or otherwise support a means for activating, after receiving the first request, a lock for a first sender address included in the first request, the lock preventing generation of a subsequent blockchain message to the first blockchain message. In some examples, to support generating the first blockchain message, the nonce manager 655 may be configured as or otherwise support a means for obtaining a next nonce associated with the first sender address. In some examples, to support generating the first blockchain message, the first blockchain network message generation component 630 may be configured as or otherwise support a means for generating the first blockchain message that includes the first set of network-specific parameters and the next nonce. In some examples, to support generating the first blockchain message, the message signature interface 665 may be configured as or otherwise support a means for transmitting the first blockchain message to a first client application for signing using at least a portion of a private key associated with the first sender address. In some examples, to support generating the first blockchain message, the signed message interface 670 may be configured as or otherwise support a means for receiving a signed version of the first blockchain message from the first client application. In some examples, to support generating the first blockchain message, the nonce manager 655 may be configured as or otherwise support a means for updating the next nonce associated with the first sender address. In some examples, to support generating the first blockchain message, the address locking component 660 may be configured as or otherwise support a means for deactivating the lock for the first sender address after updating the next nonce.

In some examples, the signed message storage component 680 may be configured as or otherwise support a means for storing, the signed version of the first blockchain message for broadcasting until a blockchain message associated with the first sender address and having a previous nonce to the next nonce is associated with a final state on the first blockchain network, wherein the signed version of the first blockchain message is broadcast in response to detecting the blockchain message is associated with the final state.

In some examples, the message monitoring interface 685 may be configured as or otherwise support a means for detecting that the blockchain message associated with the first sender address and having a previous nonce to the next nonce is associated with the final state on the first blockchain network, wherein the signed version of the first blockchain message is broadcast after detecting that the blockchain message having the previous nonce is confirmed.

In some examples, the message monitoring interface 685 may be configured as or otherwise support a means for refraining from transmitting the signed version of the first blockchain message in response to detecting that the blockchain message is in an unconfirmed message pool associated with the first blockchain network.

In some examples, the message monitoring interface 685 may be configured as or otherwise support a means for refraining from transmitting the signed version of the first blockchain message in response to determining that the first sender address is associated with an insufficient funds error message, wherein the signed version of the first blockchain message is broadcast after the first sender address is associated with sufficient funds. In some examples, the final state is a confirmed state or a failed on-chain state.

In some examples, the address generation interface 675 may be configured as or otherwise support a means for receiving, at a second API endpoint, a request to generate a first sender address corresponding to the first message. In some examples, the request to generate the first sender address excludes an indication of a private key.

In some examples, the request to generate the first sender address excludes an indication of one or more properties on which generation of addresses for use with the first blockchain network is conditioned.

Figure 7:
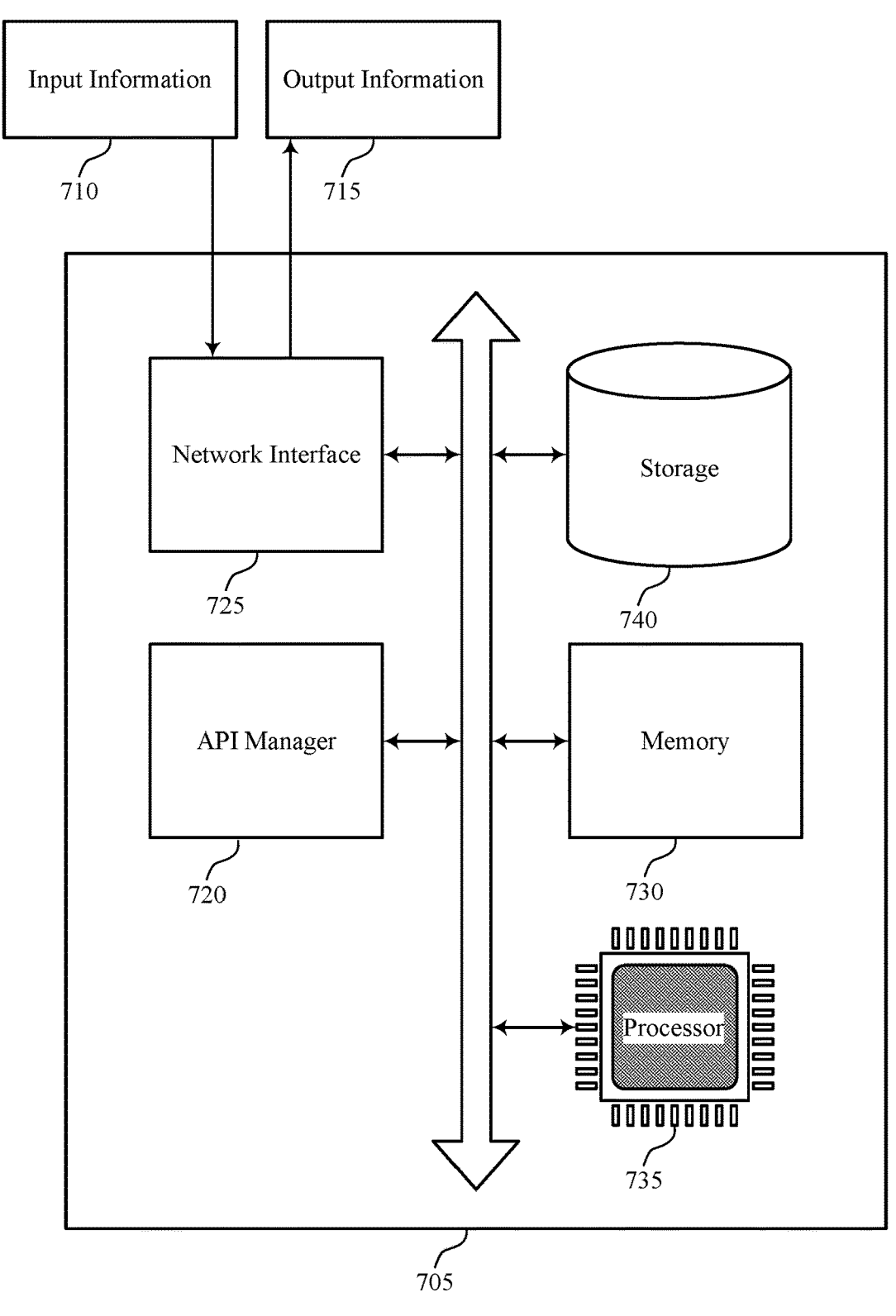
FIG. 7 shows a diagram of a system including a device that supports wallet as a service in accordance with aspects of the present disclosure.

FIG. 7 shows a diagram of a system 700 including a system 705 that supports wallet as a service in accordance with aspects of the present disclosure. The system 705 may be an example of or include the components of a system 505 as described herein. The system 705 may include components for blockchain network interfacing including components for transmitting and receiving communications, such as an API manager 720, an input information 710, an output information 715, a network interface 725, a memory 730, a processor 735, and a storage 740. Each of these components may communicate, directly or indirectly, with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause the processor 735 to perform various functions described herein, such as functions supporting wallet as a service. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting wallet as a service). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as the custodial token platform 110.

For example, the API manager 720 may be configured as or otherwise support a means for receiving, at an application programming interface (API) endpoint, a set of requests to broadcast messages via one or more blockchain networks, the set of requests including a first request to broadcast a first message via a first blockchain network and a second request to broadcast a second message via a second blockchain network. The API manager 720 may be configured as or otherwise support a means for generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The API manager 720 may be configured as or otherwise support a means for generating, using the mapping, a second blockchain message corresponding to the second message and including a second set of network-specific parameters that are mapped to the second blockchain network in the mapping, wherein the second set of network-specific parameters is different from the first set of network-specific parameters. The API manager 720 may be configured as or otherwise support a means for broadcasting the first blockchain message via a first node of the first blockchain network. The API manager 720 may be configured as or otherwise support a means for broadcasting the second blockchain message via a second node of the second blockchain network.

By including or configuring the API manager 720 in accordance with examples as described herein, the system 705 may support techniques for reducing processor and resource overhead by removing processor intensive operations from clients and removing transaction complexities from clients.

FIG. 8 shows a flowchart illustrating a method 800 that supports wallet as a service in accordance with aspects of the present disclosure. The operations of the method 800 may be implemented by a custodial token platform or its components as described herein. For example, the operations of the method 800 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 805, the method may include receiving, at an application programming interface (API) endpoint, a set of requests to broadcast messages via one or more blockchain networks, the set of requests including a first request to broadcast a first message via a first blockchain network and a second request to broadcast a second message via a second blockchain network. The operations of 805 may be performed in accordance with examples as disclosed herein. In some examples, aspects of the operations of 805 may be performed by a message broadcast interface 625 as described with reference to FIG. 6.

At 810, the method may include generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The operations of 810 may be performed in accordance with examples as disclosed herein. In some examples, aspects of the operations of 810 may be performed by a first blockchain network message generation component 630 as described with reference to FIG. 6.

At 815, the method may include generating, using the mapping, a second blockchain message corresponding to the second message and including a second set of network-specific parameters that are mapped to the second blockchain network in the mapping, wherein the second set of network-specific parameters is different from the first set of network-specific parameters. The operations of 815 may be performed in accordance with examples as disclosed herein. In some examples, aspects of the operations of 815 may be performed by a second blockchain network message generation component 635 as described with reference to FIG. 6.

At 820, the method may include broadcasting the first blockchain message via a first node of the first blockchain network. The operations of 820 may be performed in accordance with examples as disclosed herein. In some examples, aspects of the operations of 820 may be performed by a first blockchain network interface 640 as described with reference to FIG. 6.

At 825, the method may include broadcasting the second blockchain message via a second node of the second blockchain network. The operations of 825 may be performed in accordance with examples as disclosed herein. In some examples, aspects of the operations of 825 may be performed by a second blockchain network interface 645 as described with reference to FIG. 6.

FIG. 9 shows a flowchart illustrating a method 900 that supports wallet as a service in accordance with aspects of the present disclosure. The operations of the method 900 may be implemented by a custodial token platform or its components as described herein. For example, the operations of the method 900 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include receiving, at an application programming interface (API) endpoint, a set of requests to broadcast messages via one or more blockchain networks, the set of requests including a first request to broadcast a first message via a first blockchain network and a second request to broadcast a second message via a second blockchain network. The operations of 905 may be performed in accordance with examples as disclosed herein. In some examples, aspects of the operations of 905 may be performed by a message broadcast interface 625 as described with reference to FIG. 6.

At 910, the method may include generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The operations of 910 may be performed in accordance with examples as disclosed herein. In some examples, aspects of the operations of 910 may be performed by a first blockchain network message generation component 630 as described with reference to FIG. 6.

At 915, the method may include generating the nonce associated with the first blockchain message using a nonce service associated with API endpoint. The operations of 915 may be performed in accordance with examples as disclosed herein. In some examples, aspects of the operations of 915 may be performed by a nonce manager 655 as described with reference to FIG. 6.

At 920, the method may include generating, using the mapping, a second blockchain message corresponding to the second message and including a second set of network-specific parameters that are mapped to the second blockchain network in the mapping, wherein the second set of network-specific parameters is different from the first set of network-specific parameters. The operations of 920 may be performed in accordance with examples as disclosed herein. In some examples, aspects of the operations of 920 may be performed by a second blockchain network message generation component 635 as described with reference to FIG. 6.

At 925, the method may include broadcasting the first blockchain message via a first node of the first blockchain network. The operations of 925 may be performed in accordance with examples as disclosed herein. In some examples, aspects of the operations of 925 may be performed by a first blockchain network interface 640 as described with reference to FIG. 6.

At 930, the method may include broadcasting the second blockchain message via a second node of the second blockchain network. The operations of 930 may be performed in accordance with examples as disclosed herein. In some examples, aspects of the operations of 930 may be performed by a second blockchain network interface 645 as described with reference to FIG. 6.

FIG. 10 shows a flowchart illustrating a method 1000 that supports wallet as a service in accordance with aspects of the present disclosure. The operations of the method 1000 may be implemented by a custodial token platform or its components as described herein. For example, the operations of the method 1000 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include receiving, at an application programming interface (API) endpoint, a set of requests to broadcast messages via one or more blockchain networks, the set of requests including a first request to broadcast a first message via a first blockchain network and a second request to broadcast a second message via a second blockchain network. The operations of 1005 may be performed in accordance with examples as disclosed herein. In some examples, aspects of the operations of 1005 may be performed by a message broadcast interface 625 as described with reference to FIG. 6.

At 1010, the method may include generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The operations of 1010 may be performed in accordance with examples as disclosed herein. In some examples, aspects of the operations of 1010 may be performed by a first blockchain network message generation component 630 as described with reference to FIG. 6.

At 1015, the method may include activating, after receiving the first request, a lock for a first sender address included in the first request, the lock preventing generation of a subsequent blockchain message to the first blockchain message. The operations of 1015 may be performed in accordance with examples as disclosed herein. In some examples, aspects of the operations of 1015 may be performed by an address locking component 660 as described with reference to FIG. 6.

At 1020, the method may include obtaining a next nonce associated with the first sender address. The operations of 1020 may be performed in accordance with examples as disclosed herein. In some examples, aspects of the operations of 1020 may be performed by a nonce manager 655 as described with reference to FIG. 6.

At 1025, the method may include generating the first blockchain message that includes the first set of network-specific parameters and the next nonce. The operations of 1025 may be performed in accordance with examples as disclosed herein. In some examples, aspects of the operations of 1025 may be performed by a first blockchain network message generation component 630 as described with reference to FIG. 6.

At 1030, the method may include transmitting the first blockchain message to a first client application for signing using at least a portion of a private key associated with the first sender address. The operations of 1030 may be performed in accordance with examples as disclosed herein. In some examples, aspects of the operations of 1030 may be performed by a message signature interface 665 as described with reference to FIG. 6.

At 1035, the method may include receiving a signed version of the first blockchain message from the first client application. The operations of 1035 may be performed in accordance with examples as disclosed herein. In some examples, aspects of the operations of 1035 may be performed by a signed message interface 670 as described with reference to FIG. 6.

At 1040, the method may include updating the next nonce associated with the first sender address. The operations of 1040 may be performed in accordance with examples as disclosed herein. In some examples, aspects of the operations of 1040 may be performed by a nonce manager 655 as described with reference to FIG. 6.

At 1045, the method may include deactivating the lock for the first sender address after updating the next nonce. The operations of 1045 may be performed in accordance with examples as disclosed herein. In some examples, aspects of the operations of 1045 may be performed by an address locking component 660 as described with reference to FIG. 6.

At 1050, the method may include generating, using the mapping, a second blockchain message corresponding to the second message and including a second set of network-specific parameters that are mapped to the second blockchain network in the mapping, wherein the second set of network-specific parameters is different from the first set of network-specific parameters. The operations of 1050 may be performed in accordance with examples as disclosed herein. In some examples, aspects of the operations of 1050 may be performed by a second blockchain network message generation component 635 as described with reference to FIG. 6.

At 1055, the method may include broadcasting the first blockchain message via a first node of the first blockchain network. The operations of 1055 may be performed in accordance with examples as disclosed herein. In some examples, aspects of the operations of 1055 may be performed by a first blockchain network interface 640 as described with reference to FIG. 6.

At 1060, the method may include broadcasting the second blockchain message via a second node of the second blockchain network. The operations of 1060 may be performed in accordance with examples as disclosed herein. In some examples, aspects of the operations of 1060 may be performed by a second blockchain network interface 645 as described with reference to FIG. 6.

Figure 11:
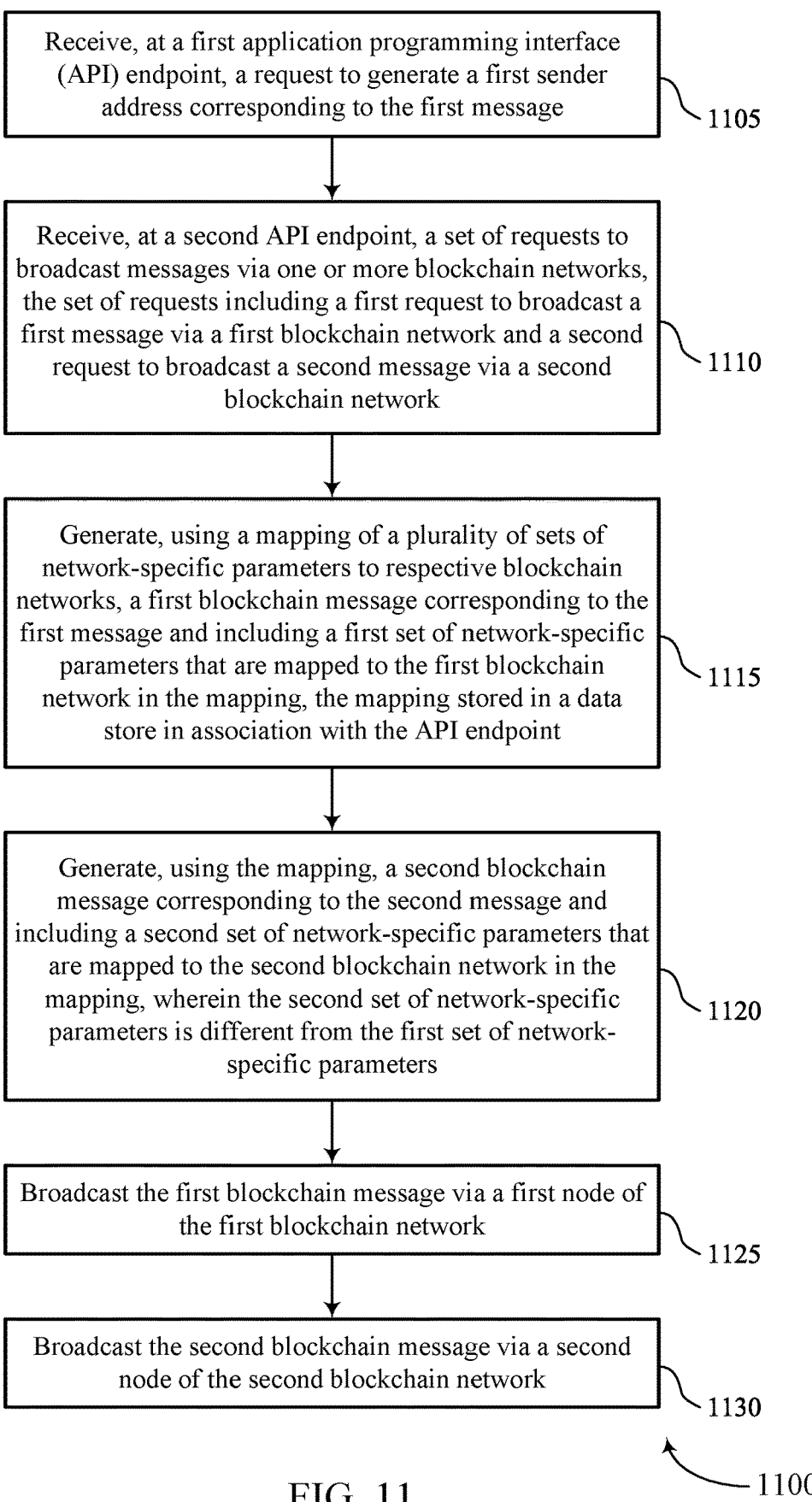

FIG. 11 shows a flowchart illustrating a method 1100 that supports wallet as a service in accordance with aspects of the present disclosure. The operations of the method 1100 may be implemented by a custodial token platform or its components as described herein. For example, the operations of the method 1100 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1105, the method may include receiving, at a first API endpoint, a request to generate a first sender address corresponding to the first message. The operations of 1105 may be performed in accordance with examples as disclosed herein. In some examples, aspects of the operations of 1105 may be performed by an address generation interface 675 as described with reference to FIG. 6.

At 1110, the method may include receiving, at a second API endpoint, a set of requests to broadcast messages via one or more blockchain networks, the set of requests including a first request to broadcast a first message via a first blockchain network and a second request to broadcast a second message via a second blockchain network. The operations of 1110 may be performed in accordance with examples as disclosed herein. In some examples, aspects of the operations of 1110 may be performed by a message broadcast interface 625 as described with reference to FIG. 6.

At 1115, the method may include generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint. The operations of 1115 may be performed in accordance with examples as disclosed herein. In some examples, aspects of the operations of 1115 may be performed by a first blockchain network message generation component 630 as described with reference to FIG. 6.

At 1120, the method may include generating, using the mapping, a second blockchain message corresponding to the second message and including a second set of network-specific parameters that are mapped to the second blockchain network in the mapping, wherein the second set of network-specific parameters is different from the first set of network-specific parameters. The operations of 1120 may be performed in accordance with examples as disclosed herein. In some examples, aspects of the operations of 1120 may be performed by a second blockchain network message generation component 635 as described with reference to FIG. 6.

At 1125, the method may include broadcasting the first blockchain message via a first node of the first blockchain network. The operations of 1125 may be performed in accordance with examples as disclosed herein. In some examples, aspects of the operations of 1125 may be performed by a first blockchain network interface 640 as described with reference to FIG. 6.

At 1130, the method may include broadcasting the second blockchain message via a second node of the second blockchain network. The operations of 1130 may be performed in accordance with examples as disclosed herein. In some examples, aspects of the operations of 1130 may be performed by a second blockchain network interface 645 as described with reference to FIG. 6.

A method is described. The method may include receiving, at an application programming interface (API) endpoint, a set of requests to broadcast messages via one or more blockchain networks, the set of requests including a first request to broadcast a first message via a first blockchain network and a second request to broadcast a second message via a second blockchain network, generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint, generating, using the mapping, a second blockchain message corresponding to the second message and including a second set of network-specific parameters that are mapped to the second blockchain network in the mapping, wherein the second set of network-specific parameters is different from the first set of network-specific parameters, broadcasting the first blockchain message via a first node of the first blockchain network, and broadcasting the second blockchain message via a second node of the second blockchain network.

An apparatus is described. The apparatus may include a processor, memory coupled with the processor, and instructions stored in the memory. The instructions may be executable by the processor to cause the apparatus to receive, at an application programming interface (API) endpoint, a set of requests to broadcast messages via one or more blockchain networks, the set of requests including a first request to broadcast a first message via a first blockchain network and a second request to broadcast a second message via a second blockchain network, generate, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint, generate, using the mapping, a second blockchain message corresponding to the second message and including a second set of network-specific parameters that are mapped to the second blockchain network in the mapping, wherein the second set of network-specific parameters is different from the first set of network-specific parameters, broadcast the first blockchain message via a first node of the first blockchain network, and broadcast the second blockchain message via a second node of the second blockchain network.

Another apparatus is described. The apparatus may include means for receiving, at an application programming interface (API) endpoint, a set of requests to broadcast messages via one or more blockchain networks, the set of requests including a first request to broadcast a first message via a first blockchain network and a second request to broadcast a second message via a second blockchain network, means for generating, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint, means for generating, using the mapping, a second blockchain message corresponding to the second message and including a second set of network-specific parameters that are mapped to the second blockchain network in the mapping, wherein the second set of network-specific parameters is different from the first set of network-specific parameters, means for broadcasting the first blockchain message via a first node of the first blockchain network, and means for broadcasting the second blockchain message via a second node of the second blockchain network.

A non-transitory computer-readable medium storing code is described. The code may include instructions executable by a processor to receive, at an application programming interface (API) endpoint, a set of requests to broadcast messages via one or more blockchain networks, the set of requests including a first request to broadcast a first message via a first blockchain network and a second request to broadcast a second message via a second blockchain network, generate, using a mapping of a plurality of sets of network-specific parameters to respective blockchain networks, a first blockchain message corresponding to the first message and including a first set of network-specific parameters that are mapped to the first blockchain network in the mapping, the mapping stored in a data store in association with the API endpoint, generate, using the mapping, a second blockchain message corresponding to the second message and including a second set of network-specific parameters that are mapped to the second blockchain network in the mapping, wherein the second set of network-specific parameters is different from the first set of network-specific parameters, broadcast the first blockchain message via a first node of the first blockchain network, and broadcast the second blockchain message via a second node of the second blockchain network.

In some examples of the method, apparatuses, and non-transitory computer-readable medium described herein, the first request includes a first token type, a first sender address, and excludes additional information on which broadcasting via the first blockchain network may be conditioned and the second request includes a second token type, a second sender address, and excludes additional information on which broadcasting via the second blockchain network may be conditioned.

In some examples of the method, apparatuses, and non-transitory computer-readable medium described herein, the first blockchain network and the second blockchain network may be associated with respective sets of properties and the first request and the second request exclude indications of properties of the respective sets of properties.

In some examples of the method, apparatuses, and non-transitory computer-readable medium described herein, the first request and the second request include a corresponding quantity of parameters.

In some examples of the method, apparatuses, and non-transitory computer-readable medium described herein, generating the first blockchain message may include operations, features, means, or instructions for generating the nonce associated with the first blockchain message using a nonce service associated with API endpoint.

In some examples of the method, apparatuses, and non-transitory computer-readable medium described herein, generating the first blockchain message may include operations, features, means, or instructions for activating, after receiving the first request, a lock for a first sender address included in the first request, the lock preventing generation of a subsequent blockchain message to the first blockchain message, obtaining a next nonce associated with the first sender address, generating the first blockchain message that includes the first set of network-specific parameters and the next nonce, transmitting the first blockchain message to a first client application for signing using at least a portion of a private key associated with the first sender address, receiving a signed version of the first blockchain message from the first client application, updating the next nonce associated with the first sender address, and deactivating the lock for the first sender address after updating the next nonce.

Some examples of the method, apparatuses, and non-transitory computer-readable medium described herein may further include operations, features, means, or instructions for storing, the signed version of the first blockchain message for broadcasting until a blockchain message associated with the first sender address and having a previous nonce to the next nonce may be associated with a final state on the first blockchain network, wherein the signed version of the first blockchain message may be broadcast in response to detecting the blockchain message may be associated with the final state.

Some examples of the method, apparatuses, and non-transitory computer-readable medium described herein may further include operations, features, means, or instructions for detecting that the blockchain message associated with the first sender address and having a previous nonce to the next nonce may be associated with the final state on the first blockchain network, wherein the signed version of the first blockchain message may be broadcast after detecting that the blockchain message having the previous nonce may be confirmed.

Some examples of the method, apparatuses, and non-transitory computer-readable medium described herein may further include operations, features, means, or instructions for refraining from transmitting the signed version of the first blockchain message in response to detecting that the blockchain message may be in an unconfirmed message pool associated with the first blockchain network.

Some examples of the method, apparatuses, and non-transitory computer-readable medium described herein may further include operations, features, means, or instructions for refraining from transmitting the signed version of the first blockchain message in response to determining that the first sender address may be associated with an insufficient funds error message, wherein the signed version of the first blockchain message may be broadcast after the first sender address may be associated with sufficient funds.

In some examples of the method, apparatuses, and non-transitory computer-readable medium described herein, the final state may be a confirmed state or a failed on-chain state.

Some examples of the method, apparatuses, and non-transitory computer-readable medium described herein may further include operations, features, means, or instructions for receiving, at a second API endpoint, a request to generate a first sender address corresponding to the first message.

In some examples of the method, apparatuses, and non-transitory computer-readable medium described herein, the request to generate the first sender address excludes an indication of a private key.

In some examples of the method, apparatuses, and non-transitory computer-readable medium described herein, the request to generate the first sender address excludes an indication of one or more properties on which generation of addresses for use with the first blockchain network may be conditioned.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a wallet service supported by one or more servers, comprising:

receiving, by a first application programming interface (API) endpoint associated with the one or more servers and from a first client, a request to generate a first sender address in accordance with the wallet service including one or more multi-party computation (MPC) services;

generating, using the one or more MPC services and a MPC key generation technique, the first sender address and a first private key shard associated with the first sender address;

receiving, at a second API endpoint associated with the one or more servers, a set of requests to broadcast messages via one or more blockchain networks, the set of requests including:

a first request to broadcast a first message via a first blockchain network, wherein the first request includes the first sender address generated using the one or more MPC services and a partial signature using a second private key shard associated with the first sender address, and a second request to broadcast a second message via a second blockchain network;

generating, by the one or more servers and using a mapping of a plurality of sets of network-specific parameters to respective blockchain networks, a first blockchain message corresponding to the first message and including the first sender address and a first set of network-specific parameters that are mapped to the first blockchain network in the mapping, the mapping stored in a data store of the one or more servers in association with the second API endpoint, wherein generating the first blockchain message comprises generating a full signature using the first private key shard associated with the first sender address and the partial signature;

generating, by the one or more servers using the mapping, a second blockchain message corresponding to the second message and including a second set of network-specific parameters that are mapped to the second blockchain network in the mapping, wherein the second set of network-specific parameters is different from the first set of network-specific parameters;

broadcasting the first blockchain message via a first node of the first blockchain network; and broadcasting the second blockchain message via a second node of the second blockchain network.

2. The method of claim 1, wherein:

the first request includes a first token type, the first sender address, and excludes additional information on which broadcasting via the first blockchain network is conditioned; and the second request includes a second token type, a second sender address, and excludes additional information on which broadcasting via the second blockchain network is conditioned.

3. The method of claim 1, wherein:

the first blockchain network and the second blockchain network are associated with respective sets of properties; and the first request and the second request exclude indications of properties of the respective sets of properties.

4. The method of claim 1 wherein the first request and the second request include a corresponding quantity of parameters.

5. The method of claim 1, wherein the first request excludes an indication of a nonce associated with the first blockchain message, and wherein generating the first blockchain message comprises:

generating the nonce associated with the first blockchain message using a nonce service associated with the second API endpoint.

6. The method of claim 1, wherein generating the first blockchain message comprises:

activating, after receiving the first request, a lock for the first sender address, the lock preventing generation of a subsequent blockchain message to the first blockchain message;

obtaining a next nonce associated with the first sender address;

generating the first blockchain message that includes the first set of network-specific parameters and the next nonce;

transmitting the first blockchain message to the first client for signing using at least a portion of the first private key shared associated with the first sender address;

receiving a signed version of the first blockchain message from the first client;

updating the next nonce associated with the first sender address; and deactivating the lock for the first sender address after updating the next nonce.

7. The method of claim 6, further comprising:

storing the signed version of the first blockchain message for broadcasting until a prior blockchain message associated with the first sender address and having a previous nonce to the next nonce is associated with a final state on the first blockchain network, wherein the signed version of the first blockchain message is broadcast in response to detecting that the prior blockchain message having the previous nonce is associated with the final state.

8. The method of claim 7, further comprising:

detecting that the prior blockchain message that is associated with the first sender address and that has the previous nonce to the next nonce is associated with the final state on the first blockchain network, wherein the signed version of the first blockchain message is broadcast after detecting that the prior blockchain message having the previous nonce is confirmed.

9. The method of claim 7, further comprising:

refraining from transmitting the signed version of the first blockchain message in response to detecting that the prior blockchain message having the previous nonce is in an unconfirmed message pool associated with the first blockchain network.

10. The method of claim 7, further comprising:

refraining from transmitting the signed version of the first blockchain message in response to determining that the first sender address is associated with an insufficient funds error message, wherein the signed version of the first blockchain message is broadcast after the first sender address is associated with sufficient funds.

11. The method of claim 7, wherein the final state is a confirmed state or a failed on-chain state.

12. The method of claim 1, wherein the request to generate the first sender address excludes an indication of a private key.

13. The method of claim 1, wherein the request to generate the first sender address excludes an indication of one or more properties on which generation of addresses for use with the first blockchain network is conditioned.

14. An apparatus for a wallet service supported by one or more servers, comprising:

one or more processors;

one or more memories coupled with the one or more processors; and instructions stored in the one or more memories and executable by the one or more processors to cause the apparatus to:

receive, by a first application programming interface (API) endpoint associated with the one or more servers and from a first client, a request to generate a first sender address in accordance with the wallet service including one or more multi-party computation (MPC) services;

generate, using the one or more MPC services and a MPC key generation technique, the first sender address and a first private key shard associated with the first sender address;

receive, at a second API endpoint associated with the one or more servers, a set of requests to broadcast messages via one or more blockchain networks, the set of requests including:

a first request to broadcast a first message via a first blockchain network, wherein the first request includes the first sender address generated using the one or more MPC services and a partial signature using a second private key shard associated with the first sender address, and a second request to broadcast a second message via a second blockchain network;

generate, by the one or more servers and using a mapping of a plurality of sets of network-specific parameters to respective blockchain networks, a first blockchain message corresponding to the first message and including the first sender address and a first set of network-specific parameters that are mapped to the first blockchain network in the mapping, the mapping stored in a data store of the one or more servers in association with the second API endpoint, wherein generating the first blockchain message comprises generating a full signature using the first private key shard associated with the first sender address and the partial signature;

generate, by the one or more servers using the mapping, a second blockchain message corresponding to the second message and including a second set of network-specific parameters that are mapped to the second blockchain network in the mapping, wherein the second set of network-specific parameters is different from the first set of network-specific parameters;

broadcast the first blockchain message via a first node of the first blockchain network; and broadcast the second blockchain message via a second node of the second blockchain network.

15. The apparatus of claim 14, wherein:

the first request includes a first token type, the first sender address, and excludes additional information on which broadcasting via the first blockchain network is conditioned; and the second request includes a second token type, a second sender address, and excludes additional information on which broadcasting via the second blockchain network is conditioned.

16. The apparatus of claim 14, wherein:

the first blockchain network and the second blockchain network are associated with respective sets of properties; and the first request and the second request exclude indications of properties of the respective sets of properties.

17. A non-transitory computer-readable medium storing code for a wallet service supported by one or more servers, the code comprising instructions executable by one or more processors to:

receive, by a first application programming interface (API) endpoint associated with the one or more servers and from a first client, a request to generate a first sender address in accordance with the wallet service including one or more multi-party computation (MPC) services;

generate, using the one or more MPC services and a MPC key generation technique, the first sender address and a first private key shard associated with the first sender address;

receive, at a second API endpoint associated with the one or more servers, a set of requests to broadcast messages via one or more blockchain networks, the set of requests including:

a first request to broadcast a first message via a first blockchain network, wherein the first request includes the first sender address generated using the one or more MPC services and a partial signature using a second private key shard associated with the first sender address, and a second request to broadcast a second message via a second blockchain network;

generate, by the one or more servers and using a mapping of a plurality of sets of network-specific parameters to respective blockchain networks, a first blockchain message corresponding to the first message and including the first sender address and a first set of network-specific parameters that are mapped to the first blockchain network in the mapping, the mapping stored in a data store of the one or more servers in association with the second API endpoint, wherein generating the first blockchain message comprises generating a full signature using the first private key shard associated with the first sender address and the partial signature;

generate, by the one or more servers using the mapping, a second blockchain message corresponding to the second message and including a second set of network-specific parameters that are mapped to the second blockchain network in the mapping, wherein the second set of network-specific parameters is different from the first set of network-specific parameters;

broadcast the first blockchain message via a first node of the first blockchain network; and broadcast the second blockchain message via a second node of the second blockchain network.

18. The non-transitory computer-readable medium of claim 17, wherein:

the first request includes a first token type, the first sender address, and excludes additional information on which broadcasting via the first blockchain network is conditioned; and the second request includes a second token type, a second sender address, and excludes additional information on which broadcasting via the second blockchain network is conditioned.

19. The non-transitory computer-readable medium of claim 17, wherein:

the first blockchain network and the second blockchain network are associated with respective sets of properties; and the first request and the second request exclude indications of properties of the respective sets of properties.

* * * * *